United States Patent [19]
Kimura

[11] Patent Number: 5,644,966
[45] Date of Patent: Jul. 8, 1997

[54] PRESSURE REGULATING CIRCUIT

[75] Inventor: Noboru Kimura, Nagoya, Japan

[73] Assignee: Hirotaka Engineering Co., Ltd., Aichi-ken, Japan

[21] Appl. No.: 684,772

[22] Filed: Jul. 1, 1996

[30]  Foreign Application Priority Data

Jul. 5, 1995 [JP] Japan .................................. 7-169737
Apr. 19, 1996 [JP] Japan .................................. 8-098618

[51] Int. Cl.$^6$ .................................................. F01B 31/12
[52] U.S. Cl. ........................... 91/1; 91/433; 91/446
[58] Field of Search .............................. 91/1, 390, 433, 91/444, 446, 448

[56]  References Cited

U.S. PATENT DOCUMENTS 5,065,665  11/1991  Kimura ..................................... 91/433
5,125,322   6/1992  Hugdahl .................................... 91/433

FOREIGN PATENT DOCUMENTS 575242  4/1958  Italy ............................................. 91/1

Primary Examiner—F. Daniel Lopez
Attorney, Agent, or Firm—Davis and Bujold

[57] ABSTRACT

A pressure regulating circuit in which the piston of a pneumatic cylinder can attain a balanced condition without requiring any adjustment to a workpiece. In the pressure regulating circuit, the pressure in an oil pressure chamber of a pressure reducing valve equals the pressure in a pressure sensitive oil chamber of a workpiece retention member. The pressure in a pressure sensitive chamber of the pressure reducing valve equals the pressure in the oil pressure chamber. Therefore, the pressure in a piston pressure chamber of a main valve connected to the pressure sensitive chamber equals the pressure in the pressure sensitive oil chamber. When the pressure in a control chamber of the main valve and the pressure in a working chamber of a pneumatic cylinder are respectively balanced with the pressure in the piston pressure chamber, the piston P can attain a balanced condition. Since the pressure in the piston pressure chamber corresponds to the oil pressure in the pressure sensitive oil chamber generated by the workpiece W, the piston P of the pneumatic cylinder can attain a balanced condition without any adjustment.

3 Claims, 9 Drawing Sheets

PRESSURE REGULATING CIRCUIT

FIELD OF THE INVENTION

This invention relates to a pressure regulating circuit in which the force counteracting the load of a workpiece connected to a piston of a pneumatic cylinder is applied to the piston.

BACKGROUND OF THE INVENTION

Conventionally, a pressure regulating circuit is known in which a workpiece attached to the tip of a piston rod can be elevated or lowered by a slight external force, just by adjusting the pressure inside an working chamber of a pneumatic cylinder to counteract the force exerted against the workpiece.

As shown in FIG. 9, in a conventional pressure regulating circuit, a pressure chamber 8 of a main valve 6 is connected to a working chamber 4 of a pneumatic cylinder 2. The pressure chamber 8 is connected to and disconnected from, via an air supply valve member 12, an air supply chamber 10 which is connected to a pressurized air supply R. An exhaust chamber 14, which is open to the outside air, is connected to and is disconnected from the pressure chamber 8 by means of an exhaust valve member 16.

A piston chamber 18 is provided above and independent of the exhaust chamber 14, and is divided into a control chamber 22 and a piston pressure chamber 24 by a pressure control piston 20. A piston rod 26 penetrating the pressure chamber 8 is connected to the pressure control piston 20. When the piston rod 26 lowers, the air supply valve member 12 is pressed down, thereby interconnecting the pressure chamber 8 and the air supply chamber 10. When the piston rod 26 is elevated, the exhaust valve member 16 is also elevated, thereby interconnecting the pressure chamber 8 and the exhaust chamber 14. The control chamber 22 is connected via an air pathway 28 to the pressure chamber 8. A port 30 of the piston pressure chamber 24 communicates with an auxiliary pressure chamber 402 of a control valve 400, and is opened via an orifice 404 to the outside air.

In the control valve 400 an auxiliary air supply chamber 406 is connected to the auxiliary pressure chamber 402 at one side and to the pressurized air supply R at the other side. The auxiliary pressure chamber 402 is connected to and disconnected from the auxiliary air supply chamber 406 by a valve member 408 having a shaft 408a penetrating through the auxiliary pressure chamber 402. A spring 410 is provided under the valve member 408 for urging the valve member 408 to close. An upper end 408b of the shaft 408a abuts the underside of a plate 418 mounted in the middle of a diaphragm 416, placed horizontally between an auxiliary control chamber 412 and a pressure spring chamber 414. The diaphragm 416 is urged downwardly by a pressure spring 420 provided in the pressure spring chamber 414, thereby lowering the valve member 408. The urging force of the pressure spring 420 can be adjusted with a handle 422. The auxiliary control chamber 412 is connected via the air pathway 28 to the pressure chamber 8 and then to the control chamber 22, such that the pressure from the pressure chamber 8 and the control chamber 22 is introduced to the auxiliary control chamber 412.

In the conventional pressure regulating circuit constructed as above, when the valve member 408 of the control valve 400 is pushed down by the pressure spring 420, the pressurized air flows from the supply R to the piston pressure chamber 24 of the main valve 6, and the pressure control piston 20 lowers, thereby pushing downward the air supply valve member 12. The pressurized air in turn flows from the supply R through the pressure chamber 8 to the working chamber 4, thereby allowing a piston P to rise together with a workpiece W. At this time the working chamber 4, the pressure chamber 8, the control chamber 22 and the auxiliary control chamber 412, which are interconnected to one another, have their pressure raised. When the pressure in the control chamber 22 surpasses that in the piston pressure chamber 24, the pressure control piston 20 is pushed upwards, thereby lifting up the piston rod 26. The air supply valve member 12 is in turn raised, disconnecting the air supply chamber 10 from the pressure chamber 8, while the exhaust valve member 16 is elevated, interconnecting the pressure chamber 8 and the exhaust chamber 14. The pressure in the working chamber 4 is reduced, and the piston P is lowered. When, by supplying the pressurized air to or discharging it from the pressure chamber 8, the pressure in the control chamber 22 and the pressure in piston pressure chamber 24 reach equilibrium, the piston rod 26 is brought into a neutral position. As shown in FIG. 8, the air supply valve member 12 and the exhaust valve member 16 are in a closed position. No air is supplied to or discharged from the pressure chamber 8 or the working chamber 4. Therefore, the piston P and the workpiece W are in a balanced condition without being raised or lowered. As aforementioned, when the pressure in the control chamber 22 and the pressure in the piston pressure chamber 24 reach equilibrium, the piston P attains a balanced condition.

The balanced condition of piston P is brought about by balancing the pressure in the control chamber 22 and the piston pressure chamber 24. The pressure in the piston pressure chamber 24 is regulated by the control valve 400. As shown in FIG. 8, when the urging force of the pressure spring 420 surpasses the pressure in the auxiliary control chamber 412 and the force of the spring 410, thereby pushing down the valve member 408, the auxiliary air supply chamber 406 is connected with the auxiliary pressure chamber 402 and the pressurized air flows toward the auxiliary pressure chamber 402. Since the pressurized air, having a larger airflow than the outflow amount from the orifice 404, flows toward the piston pressure chamber 24, the pressure in the piston pressure chamber 24 is increased.

Contrarily, when the pressure in the auxiliary control chamber 412 is increased to push the diaphragm 416 upwards, and the valve member 408 is elevated to disconnect the auxiliary air supply chamber 406 from the auxiliary pressure chamber 402, the pressurized air stops flowing into the piston pressure chamber 24. Air then flows out of the orifice 404, and the pressure in the piston pressure chamber 24 is reduced.

The pressure in the piston pressure chamber 24 is regulated by the urging force of the pressure spring 420 and by the pressure in the auxiliary control chamber 412. The pressure in the auxiliary control chamber 412 is equal to the pressure in the control chamber 22, the pressure chamber 8 and the working chamber 4. When the urging force of the pressure spring 420 is large, the pressure in the auxiliary control chamber 412 remains high, while the pressure in the piston pressure chamber 24 is in balance with that in the auxiliary control chamber 412. Contrarily, when the urging force of the pressure spring 420 is small, the pressure in the auxiliary control chamber 412 remains low, while the pressure in the piston pressure chamber 24 is in balance with that in the auxiliary control chamber 412.

Specifically, in order to place the piston P in a balanced condition, if the workpiece W provides a large load, by increasing the urging force of the pressure spring 420, the pressure in the working chamber 4 is increased. If the workpiece W provides a small load, by reducing the urging force of the pressure spring 420, the pressure in the working chamber 4 is decreased.

Under such a balanced condition, by exerting an upward external force to the workpiece W, the workpiece W is elevated, thereby reducing the pressure in the working chamber 4 and the control chamber 22. Accordingly, the pressure in auxiliary control chamber 412 is also reduced, thereby opening the control valve 400, and, as aforementioned, the pressurized air, having a larger airflow than the outflow amount from the orifice 404, flows toward the piston pressure chamber 24, thereby increasing the pressure in the piston pressure chamber 24. The pressure control piston 20 in turn lowers to push downwards the air supply valve member 12, and the pressurized air is supplied to the working chamber 4. Therefore, the workpiece W can be moved up with a slight external force.

Contrarily, under the aforementioned balanced condition, by exerting a downward external force on the workpiece W, the workpiece W is pushed downwards, thereby increasing the pressure in the working chamber 4, the control chamber 22 and the auxiliary control chamber 412. The control valve 400 is then closed, and the pressurized air stops flowing toward the piston pressure chamber 24. Since air flows out of the orifice 404, the pressure in the piston pressure chamber 24 is decreased. The pressure control piston 20 is in turn elevated to push the exhaust valve member 16 upwards, and the pressurized air is exhausted from the working chamber 4. The workpiece W can then be moved down with a slight external force.

When the workpiece W is raised or lowered with an external force and is stopped at a desired position, air is supplied to or exhausted from the pressure chamber 8. The pressure in the pressure control chamber 22 is then in balance with that in the piston pressure chamber 24. Thus, no air is supplied to or exhausted from the working chamber 4 and the workpiece W again attains a balanced condition.

As aforementioned, by adjusting the urging force of the pressure spring 420 according to the load of workpiece W, the piston P can be brought into a balanced condition. By exerting a slight external force on the workpiece W in the balanced condition, the workpiece W can be elevated or lowered.

In the conventional pressure regulating circuit, however, each time the workpiece W is replaced, the urging force of the pressure spring 420 should be adjusted again, which is troublesome.

SUMMERY OF THE INVENTION

Wherefore, an object of this invention is to provide a pressure regulating circuit in which a piston of a pneumatic cylinder can be brought into a balanced condition without any adjustment according to the workpiece.

To attain this or other objects, this invention provides a pressure regulating circuit in which a main valve is provided with an air supply chamber connected to a pressurized air source, a pressure chamber is connected to or disconnected from the air supply chamber via an air supply valve member. An exhaust chamber is connected to or disconnected from the pressure chamber via an exhaust valve member and connected to the outside air via an exhaust port. A piston rod places the air supply valve member and the exhaust valve member respectively into a closed position when the piston rod is in a neutral position, opens the air supply valve member when the piston rod moves down, and opens the exhaust valve member when the piston rod moves up. A pressure control piston is displaced according to the difference in pressure between a control chamber connected to the pressure chamber and a piston pressure chamber opposed to the control chamber and connected to the pressurized air source, thereby raising or lowering the piston rod.

The pressure regulating circuit is also provided with a pneumatic cylinder. The pneumatic cylinder is composed of a working chamber and a piston. The working chamber is connected to the pressure chamber of the main valve. To the piston P, a load according to the workpiece weight is applied via the load transferring means, and also an exerting force against the load is applied by the pressurized air in the working chamber.

Further provided in the pressure regulating circuit is a workpiece retention member displaced between the load transferring means and the workpiece to retain the workpiece. The workpiece retention member comprises a pressure sensitive oil chamber in which an oil pressure is produced when the load of the workpiece is exerted. The oil pressure is approximately equal to the pressure in the working chamber when the load counteracts the exerting force.

The pressure regulating circuit is further provided with a pressure retention means for retaining the pressure in piston pressure chamber so that it corresponds to the pressure in the pressure sensitive oil chamber.

The second aspect of the invention provides a pressure regulating circuit of the first aspect characterized in that, as a pressure retention means, a gradually releasing means is provided for gradually releasing the pressurized air from the piston pressure chamber and a supply control means is provided for supplying the pressurized air from the pressurized air source to the piston pressure chamber when the pressure in the piston pressure chamber is lower than the pressure in the pressure sensitive oil chamber.

The third aspect of the invention provides a pressure regulating circuit of the second aspect characterized in that the gradually releasing means has a structure in which the pressure air releasing speed can be controlled and an additive correction means is provided for additively correcting the pressure in the pressure sensitive oil chamber introduced in the pressure retention means.

The fourth aspect of the invention provides a pressure regulating circuit of the first aspect characterized in that, as a pressure retention means, a limiting means for limiting the pressurized air supplying speed to the piston pressure chamber and an exhaustion control means for exhausting the pressurized air from the piston pressure chamber when the pressure in the piston pressure chamber surpasses the pressure in the pressure sensitive oil chamber.

The fifth aspect of the invention provides a pressure regulating circuit of the fourth aspect characterized in that the limiting means has a structure in which the supplying speed can be controlled and a subtractive correction means is provided for subtractively correcting the pressure in the pressure sensitive oil chamber introduced in the pressure retention means.

The sixth aspect of the invention provides a pressure regulating circuit of either one of the first to fifth aspects characterized in that a piston driving means is provided for exerting an axial external force on the piston.

In the first aspect of the pressure regulating circuit, by applying a load to the workpiece retention member, an oil pressure according to the load is produced in the pressure sensitive oil chamber. The pressure retention means retains the pressure in the piston pressure chamber to correspond to the pressure in the pressure sensitive oil chamber.

When the pressure in the control chamber of the main valve is lower than the pressure in the piston pressure chamber, the pressure in the working chamber connected to the control chamber via the pressure chamber is also lower than the pressure in the piston pressure chamber.

In such a condition, as the pressure control piston moves down, the piston rod is also lowered to open the air supply valve member, thereby interconnecting the air supply chamber and the pressure chamber. Accordingly, the pressurized air flows from the pressurized air source via the air supply chamber and the pressure chamber into the working chamber of the pneumatic cylinder, thereby increasing the pressure in the working chamber. Along with the pressure increase in the working chamber, the pressure in the pressure chamber and the control chamber is also increased.

When the pressure in the control chamber surpasses the pressure in the piston pressure chamber, the pressure control piston is pushed up to raise the piston rod. Accordingly, the air supply valve member is elevated to disconnect the air supply chamber and the pressure chamber, and the exhaust valve member is elevated to interconnect the pressure chamber and the exhaust chamber. As a result, the pressure in the working chamber is decreased.

When the pressure in the control chamber and the pressure in the piston pressure chamber reach equilibrium by the pressurized air supplied to and discharged from the pressure chamber, the piston rod is brought to a neutral position, thereby placing the air supply valve member and the exhaustion valve member in a closed position. Therefore, no air is supplied to or discharged from the pressure chamber or the working chamber.

Since the pressure receiving areas of both sides of the pressure control piston respectively adjacent to the piston pressure chamber and to the control chamber are equal to each other, the pressure in the piston pressure chamber, the control chamber and the working chamber are equal to each other. Furthermore, since the pressure in the piston pressure chamber corresponds to the pressure in the pressure sensitive oil chamber, the pressure in the working chamber is approximately equal to the pressure in the pressure sensitive oil chamber. Such equilibrium is reached when the load counteracts the working force applied to the piston. Therefore, the piston attains a balanced condition equilibrium without raising or lowering the workpiece retention member or the workpiece.

Specifically, without any adjustment according to the workpiece, the piston of the pneumatic cylinder can attain a balanced condition by equalizing the pressure in the control chamber and the pressure in the pressure piston chamber.

It should be noted that the pressure in the pressure sensitive oil chamber and the pressure in the working chamber are approximately equal to each other because it is difficult to realize a mathematically exact equilibrium between them because, for example, the error is caused in the production process of the piston or the pressure sensitive oil chamber, or the friction is exerted on the piston or on other components.

Under such a balanced condition between the load and the exerting force applied to the piston, in order to approximately equalize the pressure in the pressure sensitive oil chamber and the pressure in the working chamber, for example, the pressure sensitive oil chamber is preferably formed of a cylinder member for retaining the load of the workpiece and a pressure sensitive piston connected to the piston, and the piston and the pressure sensitive piston preferably have approximately the same pressure receiving area. When the load transferring means is partially composed of pulleys, levers, gears, screws or other components for increasing or decreasing the load applied to the piston to be higher or lower than the workpiece weight, the ratio of the pressure receiving area of the piston to the pressure receiving area of the pressure sensitive piston is preferably adjusted according to the increasing or decreasing ratio.

In the second aspect of the pressure regulating circuit, the gradually releasing means composing the pressure retention means gradually releases the pressurized air from the piston pressure chamber, and the supply control means supplies the pressurized air from the pressurized air source to the piston pressure chamber when the pressure in the piston pressure chamber is lower than the pressure in the pressure sensitive oil chamber.

Specifically, the pressure in the piston pressure chamber is kept approximately constant by gradually releasing and supplying the pressurized air. The pressure increase in the piston pressure chamber caused by the excessive supply of pressurized air can be prevented.

In the third aspect of the pressure regulating circuit, the gradually releasing speed of the pressurized air can be controlled by the gradually releasing means. The additive correction means additively corrects the pressure in the pressure sensitive oil chamber introduced to the pressure retention means.

As aforementioned, it is difficult to embody the structure in which the pressure in the pressure sensitive oil chamber exactly equals the pressure in the working chamber. Moreover, the pressure in these chambers may be changed by the periodical change of the pressure regulating circuit or by other factors. When the pressure in the pressure sensitive oil chamber is lower than the pressure in the working chamber by various factors though the piston is balanced, by additively correcting the pressure in the pressure sensitive oil chamber introduced to the pressure retention means with the additively correcting means, the same result as by equalizing the pressure in the pressure sensitive oil chamber and the pressure in the working chamber can be achieved. On the contrary, when the pressure in the pressure sensitive oil chamber is higher than the pressure in the working chamber by various factors though the piston is balanced, by increasing the releasing speed of the pressurized air gradually released with the gradually releasing means, the same result as above can be achieved. Accordingly, the piston can be balanced more exactly.

In the fourth aspect of the pressure regulating circuit, the limiting means composing the pressure retention means limits the supply speed of the pressurized air to the piston pressure chamber, and the exhaustion control means exhausts the pressurized air from the piston pressure chamber when the pressure in the piston pressure chamber is higher than the pressure in the pressure sensitive oil chamber.

The pressure in the piston pressure chamber is kept approximately constant by supplying and exhausting the pressurized air. Since the limiting means limits the rapid supply of the pressurized air, the pressure increase in the piston pressure chamber caused by the excessive supply of the pressurized air can be prevented.

In the fifth aspect of the pressure regulating circuit, the pressurized air supplying speed can be controlled by the limiting means. The subtractive correction means subtractively corrects the pressure in the pressure sensitive oil chamber introduced in the pressure retention means.

As the same in the third aspect, when the pressure in the pressure sensitive oil chamber is higher than the pressure in the working chamber, by subtractively correcting the pressure in the pressure sensitive oil chamber introduced to the pressure retention means by the subtractively correcting means, the same result as by equalizing the pressure in the pressure sensitive oil chamber and the pressure in the working chamber can be attained. On the contrary, when the pressure in the pressure sensitive oil chamber is lower than the pressure in the working chamber, by increasing the supply speed of the pressurized air supplied by the limiting means, the same result can be attained. Accordingly, the piston can be balanced more exactly.

In the sixth aspect of the pressure regulating circuit, since the piston is provided with a piston driving means for exerting an axial external force on the piston, the workpiece can be raised or lowered along with the piston movement by exerting an external force on the piston by the piston driving means. The piston driving means may be, for example, manually driven using a lever attached to the piston rod or mechanically driven using a motor or a small-sized pneumatic cylinder. In either means, the piston and the workpiece can be moved with a slight external force.

BRIEF DESCRIPTION OF THE DRAWINGS

The invention will now be described, by way of example, with reference to the drawings, in which.

DETAILED DESCRIPTION OF THE PREFERRED EMBODIMENTS

Figure 1:
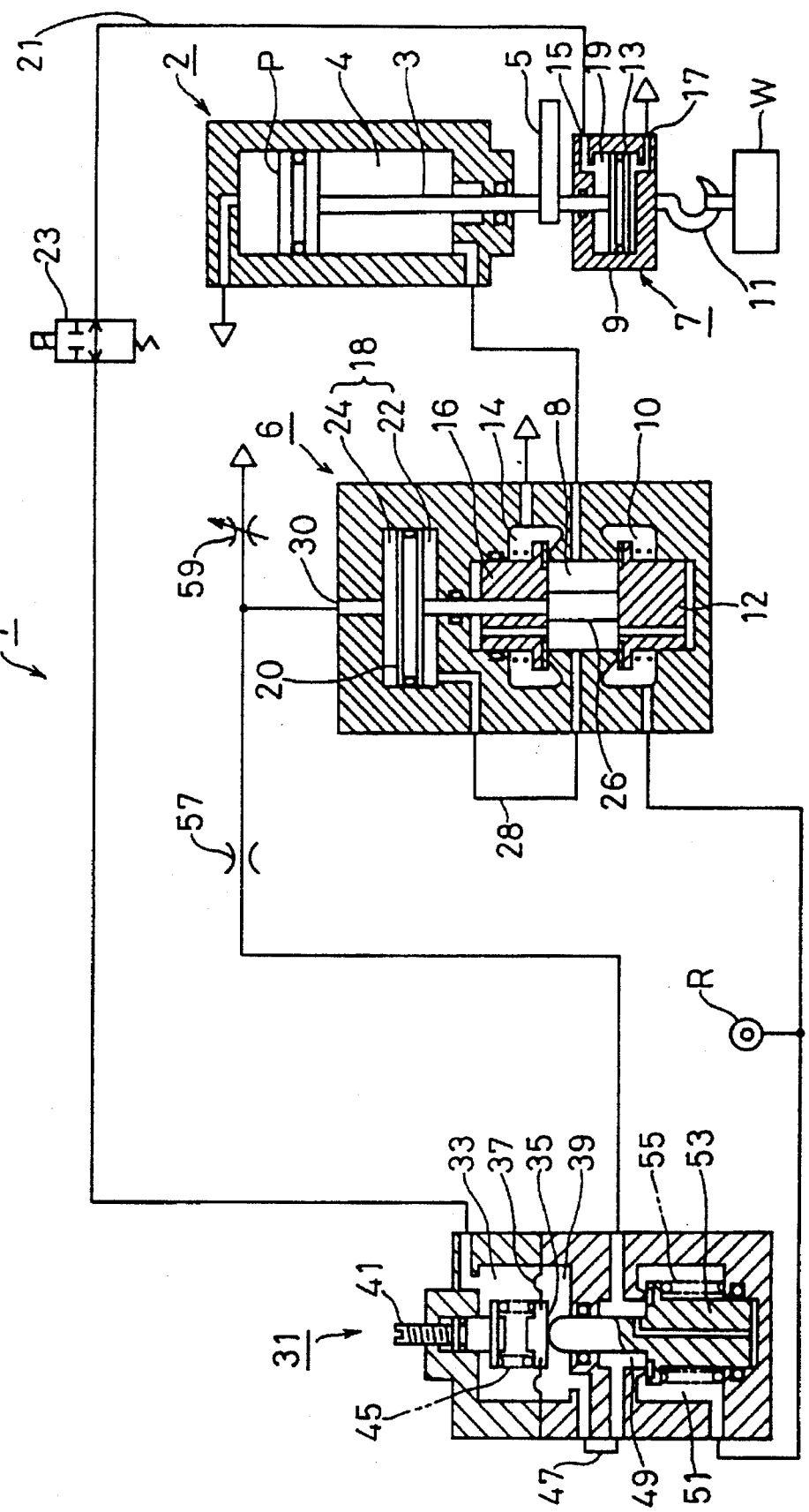
FIG. 1 is a diagrammatic representation of a pressure regulating circuit of the first embodiment of the invention.

Embodiments of the present invention will now be explained with reference to FIGS. 1–8. The reference numerals that are the same as those in FIG. 9 indicate the conventional components of the pneumatic cylinder and the main valve in the conventional pressure regulating circuit. Therefore, a detailed explanation of the corresponding components is omitted hereinafter.

Embodiment 1

As shown in FIG. 1, in the pressure regulating circuit 1 of the first embodiment, a grip 5 as a piston driving means is attached to a rod 3 of the pneumatic cylinder 2. A workpiece retention member 7 is connected to the tip of the rod 3. The workpiece retention member 7 comprises the pressure sensitive cylinder 9 and a hook 11. A pressure sensitive piston 13 connected to the rod 3 is slidingly housed in the pressure sensitive cylinder 9. On the upper end and on the lower end of the pressure sensitive cylinder 9, an oil vent 15 and an air vent 17 are respectively provided. The pressure sensitive cylinder 9 is closed except for at the oil vent 15 and the air vent 17. Adjacent to the rod 3 of the pressure sensitive piston 13, a pressure sensitive oil chamber 19 is provided. A workpiece W is attached to the hook 11.

An oil path 21 is connected to the oil vent 15 of the pressure sensitive cylinder 9. The other end of the oil path 21 is connected to an oil pressure chamber 33 of a pressure reducing valve 31.

The oil pressure chamber 33 of the pressure reducing valve 31 is closed by a diaphragm 37 having a plate 35 in the middle thereof. A pressure sensitive chamber 39 is provided adjacent to the diaphragm 37 opposed to the oil pressure chamber 33.

A corrective spring 45 is retained between the plate 35 of the diaphragm 37 and a control piston rod 41 screwed on the head portion of the pressure reducing valve 31, thereby urging the plate 35 to the pressure sensitive chamber 39. The urging force of the corrective spring 45 is increased or decreased by pivotally raising or lowering the control piston rod 41.

Since the oil pressure chamber 33 of the pressure reducing valve 31, the oil path 21 and the pressure sensitive oil chamber 19 of the pressure sensitive cylinder 9 are filled with oil, the oil pressure of the pressure sensitive oil chamber 19 is transferred to the oil pressure chamber 33.

The area of the pressure sensitive piston 13 at the side of the rod 3 and the area of the piston P at the side of rod are hereinafter respectively referred to as pressure sensitive area X and pressure receptive area Y. The pressure sensitive area X is approximately equal to the pressure receptive area Y and, when the piston P is stopped intermediately in a balanced condition as shown in FIG. 1, the pressure in the pressure sensitive oil chamber 19 is approximately equal to the pressure in the working chamber 4.

The pressure reducing valve 31 is provided with, further to the aforementioned oil pressure chamber 33 and the pressure sensitive chamber 39, an air ventilation chamber 49 connected to the pressure sensitive chamber 39 via a pathway 47 and an airflow chamber 51 connected to an air supply R.

A valve member 53 having a shaft extending from the airflow chamber 51 to the pressure sensitive chamber 39 is housed in the pressure reducing valve 31.

A spring 55 is attached under the valve member 53 for urging the valve member 53 to close, and the upper end of the valve member 53 is projected into the pressure sensitive chamber 39 and abuts the underside of the plate 35 of the diaphragm 37.

The weight of the valve member 53 itself in combination with the downward force applied to the valve member 53 by the corrective spring 45 approximately equals the upward force applied to the valve member 53 by the spring 55. The pressure in the oil pressure chamber 33 urges the valve member 53 to open via the plate 35 of diaphragm 37. When the pressure in the oil pressure chamber 33 surpasses the pressure in the pressure sensitive chamber 39, the valve member 53 is opened, thereby interconnecting the airflow chamber 51 and the air ventilation chamber 49. The urging force of the corrective spring 45 is adjusted by the control piston rod 41. Therefore, according to the adjustment, the valve member 53 can be opened even if the pressure in the oil pressure chamber 33 does not surpass the pressure in the pressure sensitive chamber 39.

The air ventilation chamber 49 is connected to the port 30 of the main valve 6 via an orifice 57, thereby connected to the piston pressure chamber 24 and further to the outside air via a needle valve 59.

In the operation of the pressure regulating circuit 1 of the first embodiment, when the workpiece W is attached to the hook 11 of the workpiece retention member 7, the load of the workpiece draws the pressure sensitive cylinder 9 downward to reduce the space in the pressure sensitive oil chamber 19. As a result, the oil pressure in accordance with the load of the workpiece is produced in the pressure sensitive oil chamber 19. The oil pressure is introduced via the oil path 21 to the oil pressure chamber 33 of the pressure reducing valve 31.

The pressure in the oil pressure chamber 33 of the pressure reducing valve 31 is increased by the oil pressure introduced from the pressure sensitive oil chamber 19 via the oil path 21. The diaphragm 37 then moves toward the pressure sensitive chamber 39 to open the valve member 53, thereby interconnecting the air ventilation chamber 49 and the air supply R. The pressurized air flowed into the air ventilation chamber 49 is introduced into the piston pressure chamber 24 of the main valve 6 to increase the pressure in the piston pressure chamber 24 and the pressure in the pressure sensitive chamber 39.

When the pressure in the piston pressure chamber 24 is increased, the pressure control piston 20 of the main valve 6 lowers to lower the piston rod 26. Accordingly, the air supply valve member 12 is lowered, thereby interconnecting the air supply chamber 10 and the pressure chamber 8. The pressurized air from the air supply R via the air supply chamber 10 and the pressure chamber 8 flows into the working chamber 4 of the pneumatic cylinder 2. The pressure in the working chamber 4 acts to elevate the piston P and then is transferred to the pressure sensitive piston 13 via the rod 3 as the force to move the pressure sensitive piston 13. The force is further transferred to the pressure sensitive cylinder 9 via the oil pressure in the pressure sensitive oil chamber 19. As a result, the force to elevate the piston P raises the workpiece W.

When the pressure in the working chamber 4 is increased, the pressure in the control chamber 22 connected to the working chamber 4 is also increased. The pressure in the control chamber 22 pushes up the pressure control piston 20.

When the pressure in the control chamber 22 surpasses the pressure in the piston pressure chamber 24, the pressure control piston 20 is elevated, thereby closing the air supply valve member 12 to stop the pressurized air supply to the pressure chamber 8 and the working chamber 4. If the pressure in the control chamber 22 is higher, the pressure control piston 20 is elevated over a neutral position to open the exhaust valve member 16. Accordingly, the pressurized air is exhausted from the pressure chamber 8 and the working chamber 4, thereby reducing the pressure in the control chamber 22. When the pressure in the control chamber 22 and the pressure in the piston pressure chamber 24 reach equilibrium, the pressure control piston 20 is brought into a neutral position. At this time, no air is suppled to or discharged from the pressure chamber 8 or the working chamber 4, On the other hand, when the pressure in the pressure sensitive chamber 39 of the pressure reducing valve 31 connected to the piston pressure chamber 24 of the main valve 6 is increased, the diaphragm 37 moves towards the oil pressure chamber 33 so that the air ventilation chamber 49 and the air supply R is disconnected by the valve member 53. As a result, the pressure in the piston pressure chamber 24 stops increasing. Since the air in the piston pressure chamber 24 is gradually released by the needle valve 59, the pressure in the piston pressure chamber 24 gradually decreases. Then, as the valve member 53 again interconnects the air ventilation chamber 49 and the air supply R, the pressure in the piston pressure chamber 24 is restored.

Thus, the pressure in the piston pressure chamber 24 is kept approximately constant by opening and closing the valve member 53.

Since the pressure in the control chamber 22 equals the pressure in the piston pressure chamber 24, and the pressure receiving areas of both sides of the pressure control piston 20 respectively adjacent to the piston pressure chamber 24 and the control chamber 22 equal each other, the pressure in the working chamber 4, the pressure chamber 8, the control chamber 22, the piston pressure chamber 24 and the pressure sensitive chamber 39 equal each other.

In such condition, the pressure in the pressure sensitive chamber 39 plus the urging force of spring 55 equals the pressure in the oil pressure chamber 33 plus the urging force of the corrective spring 45 plus the weight of the valve member 53. As aforementioned, because the urging force of the corrective spring 45 plus the weight of the valve member 53 equals the urging force of spring 55, the pressure in the pressure sensitive chamber 39 equals the pressure in the oil pressure chamber 33.

Additionally, because the pressure in the oil pressure chamber 33 equals the pressure in the pressure sensitive oil chamber 19, the pressure in the piston pressure chamber 24, the pressure in the pressure sensitive chamber 39 and the pressure in the pressure sensitive oil chamber 19 equal each other.

Specifically, the pressure in the piston pressure chamber 24 is in accordance with the pressure in the pressure sensitive oil chamber 19 or the load of the workpiece W.

When, as aforementioned, the pressure in the control chamber 22 and the pressure in the piston pressure chamber 24 reach equilibrium by supplying the pressurized air to or discharging it from the pressure chamber 8, no pressurized air is supplied to or discharged from the pressure chamber 8 or the working chamber 4. Therefore, the piston P and the workpiece W are balanced without being raised or lowered.

Accordingly, the piston P of the pneumatic cylinder 2 attains a balanced condition without any adjustment according to the workpiece W.

As apparent from the aforementioned explanation, the pressure reducing valve 31 and the needle valve 59 respectively correspond to the supply control means and the gradually releasing means of the invention, which in combination constitute the pressure retention means of the invention.

Under such a balanced condition, by exerting an upward external force on the grip 5, the piston P is elevated. As a result, a slight decrease of the pressure in the working chamber 4 causes a decrease of the pressure in the control chamber 22, thereby lowering the pressure control piston 20. Accordingly, the air supply valve member 12 is opened, and the pressurized air is supplied to the working chamber 4. Thus, the workpiece W along with the piston P can be easily elevated by exerting a slight external force on the grip 5.

When the grip 5 is rapidly raised at this time, as the workpiece W is forced to keep the original position by the inertial force, the pressure in the pressure sensitive oil chamber 19 is instantly increased. This pressure increase is immediately transferred to the oil pressure chamber 33 of the pressure reducing valve 31, thereby opening the valve member 53. Then, the pressurized air is supplied to the piston pressure chamber 24, and the pressure in the piston pressure chamber 24 is rapidly increased. Accordingly, the pressure control piston 20 is rapidly lowered, thereby opening the air supply valve member 12 to supply the pressurized air rapidly to the working chamber 4. Since the piston P follows the rapid raising of the grip 5, the workpiece W is also rapidly elevated. Thus, the workpiece W can be rapidly raised without exerting a large force on the grip 5.

When a downward force is exerted on the grip 5 in a balanced condition, the piston P is lowered. Therefore, a slight increase of the pressure in the working chamber 4 causes the increase of the pressure in the control chamber 22, thereby elevating the pressure control piston 20. Accordingly, the exhaust valve member 16 is opened and the pressurized air is discharged from the working chamber 4. Thus, the workpiece W along with the piston P can be easily lowered by exerting a slight external force on the grip 5.

Under the aforementioned balanced condition, by rapidly lowering the grip 5, according to the inertial force of the workpiece W, the pressure in the pressure sensitive oil chamber 19 is instantly decreased.

On the other hand, since the pressure in the working chamber 4 increases, the pressure in the control chamber 22 of the main valve 6 is also increased, thereby pushing up the pressure control piston 20. As a result, the exhaust valve member 16 is opened, the air is discharged from the working chamber 4, and the pressure in the control chamber 22 is decreased.

However, since the pressure in the pressure sensitive oil chamber 19 has been decreased, the valve member 53 cannot be opened immediately. Accordingly, the pressure increase in the piston pressure chamber 24 is delayed and the air discharge from the working chamber 4 is continued. Since the piston P follows the rapid lowering of the grip 5, the workpiece W is also rapidly lowered. Thus, the workpiece W can be rapidly lowered without exerting a large force on the grip 5.

As aforementioned, by raising or lowering the rod 3 via the grip 5, the workpiece W can be easily raised or lowered. Furthermore, a slight external force applied to the grip 5 is enough for rapidly raising or lowering the rod 3. The upward or downward action of the workpiece W can be rapidly stopped by the same operation as aforementioned. Thus, the workpiece W can be flexibly raised or lowered.

However, when an external force is applied directly to the workpiece W for elevating the workpiece W, since the pressure in the pressure sensitive oil chamber 19 is decreased, the pressure in the oil pressure chamber 33 of the pressure reducing valve 31 is also decreased. Therefore, the valve member 53 is not opened and no pressurized air is supplied to the piston pressure chamber 24. Accordingly, it is difficult to lower the pressure control piston 20. Thus, no pressurized air is supplied to the working chamber 4 and the piston P cannot be elevated.

Furthermore, when an external force is applied directly to the workpiece W for lowering the workpiece W, the piston P cannot be lowered since the pressure in the pressure sensitive oil chamber 19 is increased, Specifically, it is impossible to raise or lower the workpiece W by directly exerting an external force on the workpiece W. However, by exerting an external force directly on the workpiece W after closing a two-way valve 23 to disconnect the pressure sensitive oil chamber 19 and the oil pressure chamber 33, the force is transferred to the piston P via the pressure sensitive oil chamber 19 to raise or lower the workpiece W as the same with the aforementioned method using the grip 5.

When the pressure in the pressure sensitive oil chamber 19 is lower than the pressure in the working chamber 4 because, for example, the pressure sensitive area X of pressure sensitive piston 13 is larger than the pressure receiving area Y of piston P or for other reasons, by increasing the urging force of the corrective spring 45 with the control piston rod 41 of the pressure reducing valve 31, the pressure regulating circuit 1 can be activated as aforementioned. Thus, the control piston rod 41 and the corrective spring 45 correspond to the additive correction means of the invention.

When the pressure in the pressure sensitive oil chamber 19 is higher than the pressure in the working chamber 4 because, for example, the pressure sensitive area X of the pressure sensitive piston 13 is smaller than the pressure receiving area Y of the piston P or for other reasons, by increasing the opening of the needle valve 59 to raise the air discharging speed from the piston pressure chamber 24, the pressure regulating circuit 1 can be activated as aforementioned. Thus, the needle valve 59 corresponds to the gradually releasing means of the invention.

Furthermore, as it is obvious from the above explanations, the workpiece retention member 7 and the rod 3 constitute the load transferring means of the present invention.

Modification 1

The responsibility of the pressure regulating circuit 1 of the first embodiment is improved. The same pneumatic cylinder and the same main valve with those of the first embodiment is provided.

Different from the first embodiment, the pressure sensitive chamber 39 of a control valve 32 is not connected to the air ventilation chamber 49 and is connected to the pressure chamber 8 of the main valve 6.

Figure 2:
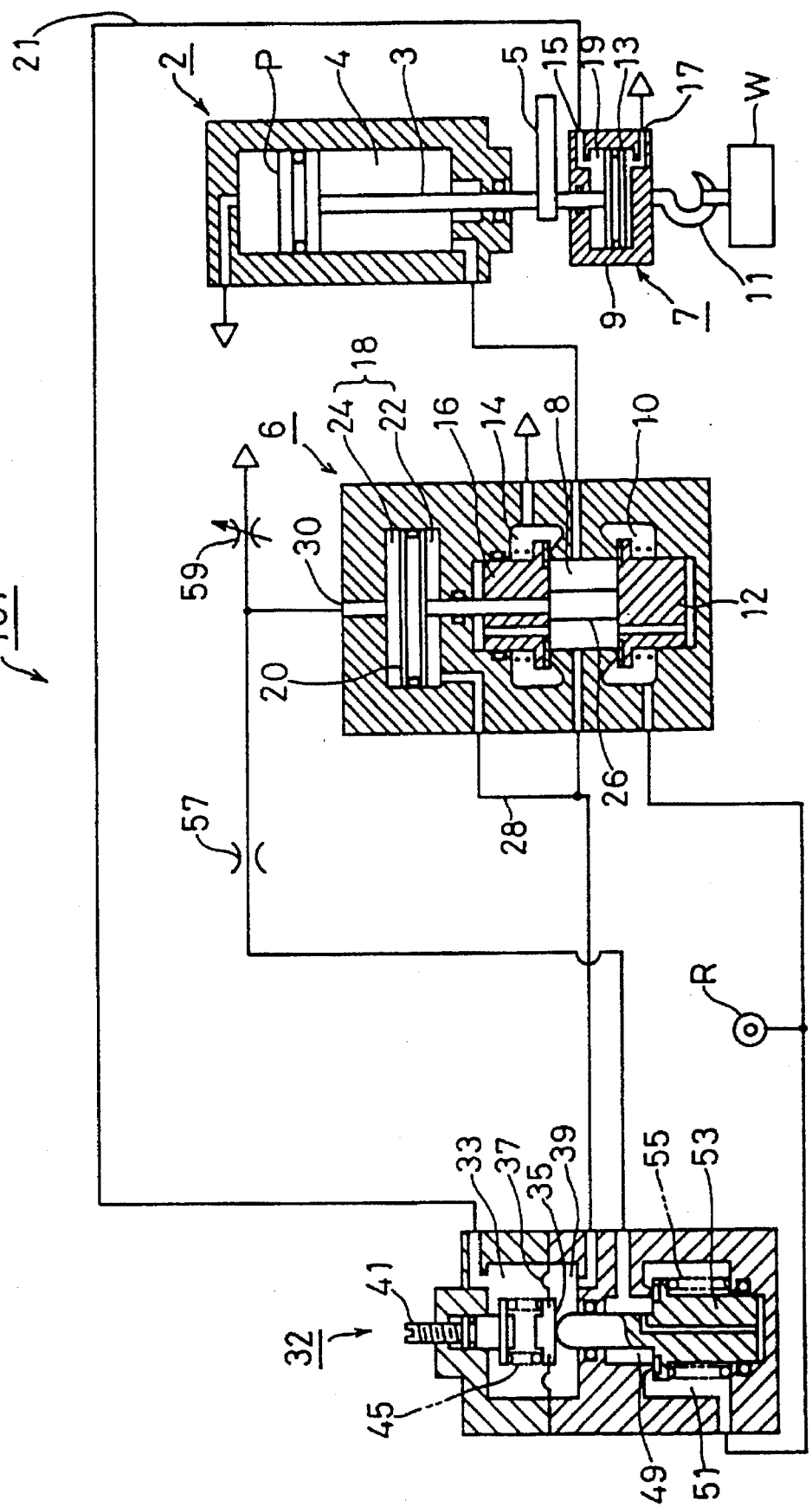
FIG. 2 is a diagrammatic representation of a pressure regulating circuit of the first modification.

As obvious from the structure shown in FIG. 2, the pressure in the working chamber 4 is introduced into the pressure sensitive chamber 39 as a feedback pressure. Therefore, the responsibility is higher than that of the first embodiment, in which the pressure in the working chamber 4 is indirectly introduced into the pressure sensitive chamber 39 via the pressure in the piston pressure chamber 24 as a feedback pressure.

By providing a two-way valve in the middle of the oil path 21 and closing the two-way valve 23 in a balanced condition, the workpiece W can be raised or lowered by exerting an external force directly on the workpiece W as the same in the first embodiment.

Embodiment 2

The pressure regulating circuit 102 of the second embodiment is provided with a pressure sensitive valve 103 and a pressure reducing valve 105 both having the same structure with the pressure reducing valve 31 of the first embodiment, and a relief valve 107 having the same structure with the control valve 32 of the first modification. A chamber 33a of the pressure sensitive valve 103 is called an oil pressure chamber, and the portions corresponding to the chambers of the pressure reducing valve 105 and of the relief valve 107 are respectively called a diaphragm chamber 33b and a diaphragm chamber 33c. The main valve 6 and the pneumatic cylinder 2 are also identical with those of the first embodiment. The structural features and the performance of the second embodiment which are identical with those of the first embodiment are not explained hereinafter.

Figure 3:
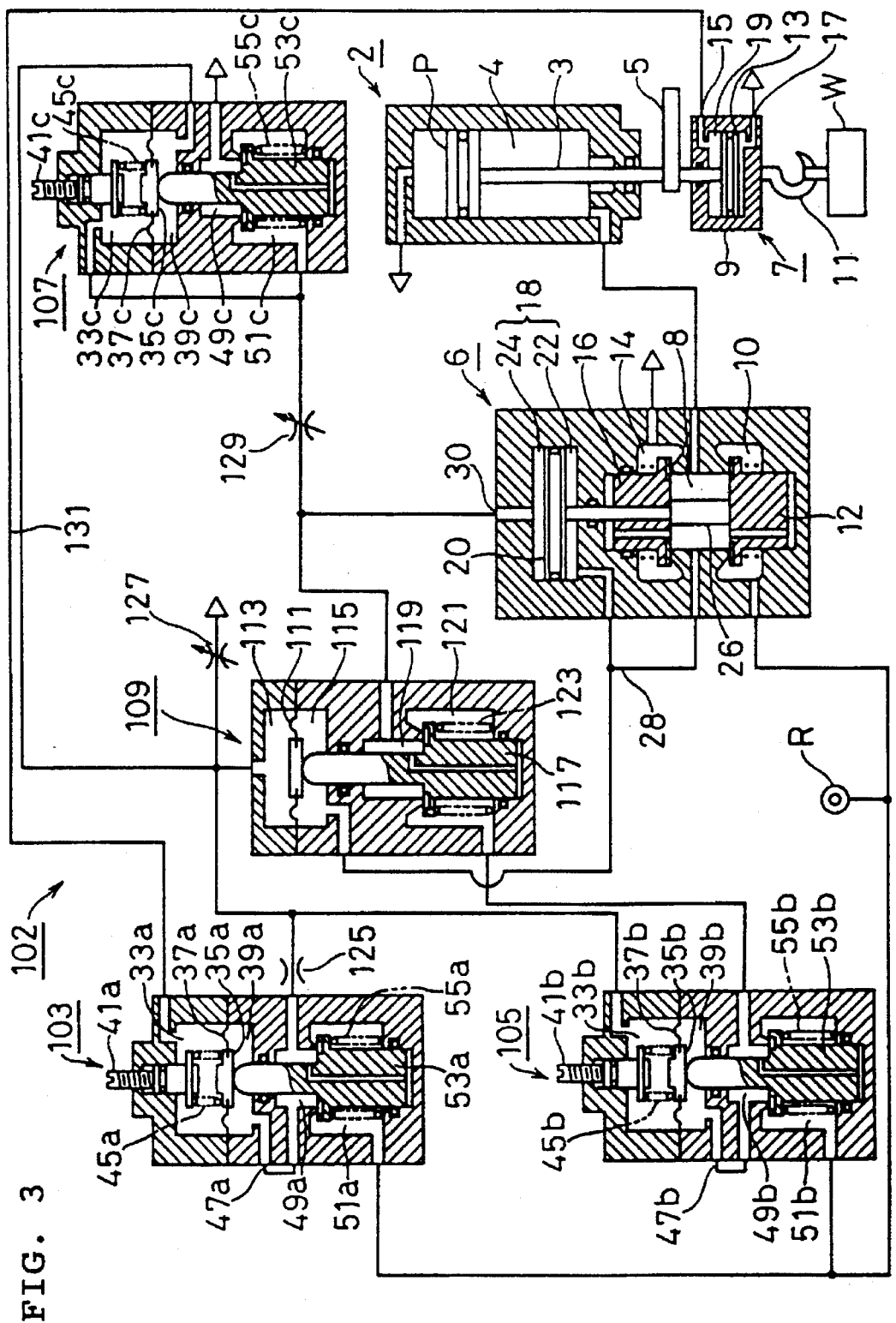
FIG. 3 is a diagrammatic representation of a pressure regulating circuit of the second embodiment of the invention.

As shown in FIG. 3, further to the aforementioned pressure sensitive valve 103, the pressure reducing valve 105 and the relief valve 107, the pressure regulating circuit 102 is provided with a control valve 109 comprising a diaphragm chamber 113, an auxiliary control chamber 115, an auxiliary pressure chamber 119 and an auxiliary air supply chamber 121. A diaphragm 111 is provided between the diaphragm chamber 113 and the auxiliary control chamber 115. The auxiliary pressure chamber 119 and the auxiliary air supply chamber 121 are connected and disconnected by a valve member 117, which is urged upwardly to close by a spring 123. The urging force of the spring 123 is adjusted so that it slightly surpasses the load of the valve member 117. Therefore, when the pressure in the diaphragm chamber 113 surpasses the pressure in the auxiliary control chamber 115, the valve member 117 is moved downwardly to open, thereby interconnecting the auxiliary pressure chamber 119 and the auxiliary air supply chamber 121.

The diaphragm chamber 113 of the control valve 109 is connected to the air ventilation chamber 49a of the pressure sensitive valve 103 via an orifice 125 and is further opened to the outside air via the needle valve 127. It is also connected to the diaphragm chamber 33b of the pressure reducing valve 105 and the pressure sensitive chamber 39c of the relief valve 107.

The auxiliary control chamber 115 of the control valve 109 is connected to the control chamber 22 and the pressure chamber 8 of the main valve 6.

The auxiliary pressure chamber 119 of the control valve 109 is connected to the piston pressure chamber 24 of the main valve 6, and then to the diaphragm chamber 33c and to an air introduction chamber 51c of the relief valve 107 via a needle valve 129. The auxiliary air supply chamber 121 of the control valve 109 is connected to the air ventilation chamber 49b of the pressure reducing valve 105.

In the pressure sensitive valve 103, the chamber 33a is connected to the pressure sensitive oil chamber 19 of the pressure sensitive cylinder 9 via an oil path 131. The introduction chamber 51a of the pressure sensitive valve 103 and the air introduction chamber 51b of the pressure reducing valve 105 are connected to the air supply R.

In the operation of the pressure regulating circuit 102 of the second embodiment, an oil pressure is produced in the pressure sensitive oil chamber 19 by the load of workpiece W in the same manner as the first embodiment. The oil pressure is introduced to the oil pressure chamber 33a of the pressure sensitive valve 103 via the oil path 131, thereby raising the pressure in the oil pressure chamber 33a to the same pressure in the pressure sensitive oil chamber 19. Accordingly, the valve member 53a is lowered so that the pressurized air in the air introduction chamber 51a flows into the air ventilation chamber 49a. The pressurized air in the air ventilation chamber 49a further flows into the diaphragm chamber 33b of the pressure reducing valve 105, diaphragm chamber 113 of the control valve 109 and the pressure sensitive chamber 39c of the relief valve 107.

The valve member 53b of the pressure reducing valve 105 is lowered by the pressure increase in the diaphragm chamber 33b, thereby interconnecting the air introduction chamber 51b and the air ventilation chamber 49b. Accordingly, the pressurized air from the air supply R through the pressure reducing valve 105 flows into the auxiliary air supply chamber 121 of the control valve 109.

As obvious from the structure shown in the figure, when the pressure in the pressure sensitive chamber 39b surpasses the pressure in the diaphragm chamber 33b plus the pressure difference equals the urging force of the corrective spring 45b, the plate 35b is placed in a neutral position to close the pressure reducing valve 105. When the pressure in the pressure sensitive chamber 39b is lower than the amount of the pressure in the diaphragm chamber 33b and the urging force of the corrective spring 45b, the pressure reducing valve 105 is opened. Specifically, the secondary pressure in the pressure reducing valve 105 is higher than the amount of the secondary pressure in the pressure sensitive valve 103 introduced in the diaphragm chamber 33b and the urging force of the corrective spring 45b. Accordingly, the pressure in the auxiliary air supply chamber 121 of the control valve 109, into which the secondary pressure in the pressure reducing valve 105 is supplied, also surpasses the amount of the secondary pressure in pressure sensitive valve 103 and the urging force of corrective spring 45b.

In the control valve 109, the pressurized air flows into the diaphragm chamber 113 to lower the valve member 117, thereby interconnecting the auxiliary air supply chamber 121 and the auxiliary pressure chamber 119. Accordingly, the pressurized air flows into the auxiliary air supply chamber 121 and further to the piston pressure chamber 24 of the main valve 6 through the auxiliary pressure chamber 119. The airflow is disturbed by the needle valve 129. As a result, the pressure at the upperstream side of the needle valve 129 is increased, thereby increasing the pressure in the piston pressure chamber 24. Since the pressure increase in the piston pressure chamber 24 lowers the pressure control piston 20, the piston rod 26 also lowers. Accordingly, the air supply valve member 12 lowers, thereby interconnecting the air supply chamber 10 and the pressure chamber 8. Then the pressurized air from the pressurized air supply R via the air supply chamber 10 and the pressure chamber 8 flows into the working chamber 4 of the pneumatic cylinder 2. The pressure in the working chamber 4 elevates the piston P, and is further exerted on the pressure sensitive piston 13 via the rod 3. The force to move the pressure sensitive piston 13 is exerted on the pressure sensitive cylinder 9 by the oil pressure in the pressure sensitive oil chamber 19. As a result, the elevating force of the piston P elevates the workpiece W.

Since the control chamber 22 communicates with the working chamber 4, when the pressure in the working chamber 4 increases, the pressure in the control chamber 22 also increases, thereby pushing up the pressure control piston 20. Furthermore, when the pressure in the auxiliary control chamber 115 of the control valve 109 communicating with the control chamber 22 is increased, the diaphragm 111 moves towards the diaphragm chamber 113 so that the valve member 117 disconnects the auxiliary pressure chamber 119 and the auxiliary air supply chamber 121. As a result, the pressurized air supply to the piston pressure chamber 24 is stopped.

When the pressure in the control chamber 22 surpasses the pressure in the piston pressure chamber 24, the pressure control piston 20 is raised to move the air supply valve member 12 to the closed position, thereby stopping the pressurized air supply to the pressure chamber 8 and the working chamber 4. If the pressure in the control chamber 22 is higher, the pressure control piston 20 is raised over a neutral position to move the exhaust valve member 16 to the opened position to exhaust the pressurized air from the pressure chamber 8 and the working chamber 4. As a result, the pressure in the control chamber 22 is reduced. When the pressure in the control chamber 22 and the pressure in the piston pressure chamber 24 reach equilibrium, the pressure control piston 20 is placed in a neutral position so that no air is supplied to or discharged from the pressure chamber 8 or the working chamber 4.

On the other hand, in the relief valve 107, the pressure at the downstream side of the needle valve 129 is introduced into the diaphragm chamber 33c. If the amount of the pressure in diaphragm chamber 33c and the urging force of the corrective spring 45c, which in combination push down the diaphragm 37c, surpasses the pressure in the pressure sensitive chamber 39c which pushes up the diaphragm 37c, the valve member 53c is moved to the opened position to discharge the air from the downstream side of the needle valve 129 to the outside air. On the contrary, if the force to push up the diaphragm 37c surpasses the force to push down the same, the valve member 53c is moved to the closed position. Concisely, if the pressure in diaphragm 33c surpasses the difference between the pressure in pressure sensitive chamber 39c and the urging force of the corrective spring 45c, the valve member 53c is moved to the opened position. In contrast, if the pressure in diaphragm 33c becomes lower than the aforementioned difference, the valve member 53c is moved to the closed position.

Therefore, the pressure at the downstream side of the needle valve 129 is lower than the pressure in the pressure sensitive chamber 39c and the pressure difference equals the urging force of the corrective spring 45c.

Since the pressure in the pressure sensitive chamber 39c is the secondary pressure of the pressure sensitive valve 103, the pressure at the downstream side of the needle valve 129 is lower than the secondary pressure of the pressure sensitive valve 103, and the pressure difference equals to the urging force of the corrective spring 45c. Since the pressure at the upperstream side of the needle valve 129 or the pressure in the piston pressure chamber 24 approximately equals the secondary pressure of the pressure reducing valve 105 as aforementioned, the gradual release of the pressurized air from the needle valve 129 to the relief valve 107 continues until and after the pressure in the piston pressure chamber 24 and the pressure in the control chamber 22 reach equilibrium as aforementioned.

Because of the airflow through the needle valve 129, the pressure in the piston pressure chamber 24 is gradually reduced. Accordingly, the equilibrium of the pressure in the piston pressure chamber 24 and the pressure in the control chamber 22 is lost and the pressure control piston 20 is raised. The exhaust valve member 16 is then moved to the opened position to discharge the pressurized air from the pressure chamber 8, thereby reducing the pressure in the control chamber 22 and accordingly the pressure in the auxiliary control chamber 115. Since the valve member 117 again interconnects the auxiliary pressure chamber 119 and the auxiliary air supply chamber 121, the pressure in the piston pressure chamber 24 is restored.

As aforementioned, when the pressure in the piston pressure chamber 24 is kept approximately constant by opening or closing the valve member 117, the pressure in the control chamber 22 and the pressure in the piston pressure chamber 24 reach equilibrium. Since the pressure in the working chamber 4 is kept constant approximately in this state, the piston P attains a balanced condition.

Since the aforementioned balanced condition is attained, and the pressure receiving area of both sides of the piston pressure chamber 20 respectively facing the piston pressure chamber 24 and the control chamber 22 are equal to each other, the pressure in the piston pressure chamber 24 equals the pressure in the control chamber 22, which further equals the pressure in the auxiliary control chamber 115 of the control valve 109. The pressure in the auxiliary control chamber 115 equals the pressure in the diaphragm chamber 113, which further equals the pressure in the pressure sensitive chamber 39a of the pressure sensitive valve 103. The pressure in pressure sensitive chamber 39a equals the pressure in the oil pressure chamber 33a or the pressure in the pressure sensitive oil chamber 19. Specifically, since the pressure in the piston pressure chamber 24 is in accordance with the pressure in the pressure sensitive oil chamber 19 or the load of the workpiece W, the piston P attains a balanced condition. As aforementioned, the piston P of the pneumatic cylinder 2 of the pressure regulating circuit 102 attains a balanced condition without any adjustment according to the workpiece W.

Under such a balanced condition, by exerting an external force on the grip 5, the piston P along with the workpiece W is elevated, thereby reducing the pressure in the working chamber 4. Accordingly, the pressure in the auxiliary control chamber 115 and the control chamber 22 is also reduced, thereby opening the control valve 109. The pressurized air then flows from the auxiliary air supply chamber 121 to the piston pressure chamber 24 to push down the pressure control piston 20. Since the pressure of the air to be supplied to the auxiliary air supply chamber 121 is higher than the pressure in the piston pressure chamber 24 which approximately equals the secondary pressure in the pressure sensitive valve 103, and the pressure difference equals the urging force of the corrective spring 45b, the difference between the pressure in the piston pressure chamber 24 and the pressure in the auxiliary air supply chamber 121 remains small. Therefore, the air in the auxiliary air supply chamber 121 cannot flow rapidly into the piston pressure chamber 24 by opening the control valve 109, and the pressure control piston 20 cannot be rapidly pushed down. Accordingly, the highly pressurized air cannot be rapidly flowed from the air supply R to the working chamber 4. Thus, the highly pressurized air can be prevented from rapidly flowing into the working chamber 4 which may cause the rapid elevation of the piston P and the workpiece W.

However, as the airflow into the piston pressure chamber 24 is not prevented, the piston P and the workpiece W can be smoothly elevated.

Under such a balanced condition, by exerting an external force on the piston P to lower the same, the pressure in the working chamber 4 is increased. Accordingly, the pressure in the auxiliary control chamber 115 and the pressure in the control chamber 22 are also increased, thereby closing the control valve 109. Since the pressure control piston 20 is pushed up at the same time, the pressure in the piston pressure chamber 24 is increased in accordance with the shift amount of the pressure control piston 20, thereby enhancing the airflow from the needle valve 129.

However, since the pressure at the downstream side of the needle valve 129 is kept lower than the pressure at the upperstream side of the needle valve 129 by the relief valve 107, and the pressure difference equals and never surpasses the urging force of the corrective spring 45c as aforementioned, no rapid airflow from the needle valve 129 can be caused, thereby preventing the excessive air exhaustion from the piston pressure chamber 24. Accordingly, the rapid elevation of the exhaust valve member 16 caused by the rapid elevation of the pressure control piston 20 or the rapid elevation of the piston rod 26 is avoided. Therefore, the air cannot be rapidly exhausted from the pressure chamber 8, thereby preventing the rapid decrease of the pressure in the working chamber 4 which may cause the rapid fall of the piston P and the workpiece W.

However, as the air exhaustion from the piston pressure chamber 24 is not prevented, the piston P and the workpiece W can be smoothly lowered.

As aforementioned, according to the pressure regulating circuit 102 of the second embodiment, under a balanced condition, by exerting an external force to the piston P, the piston P and the workpiece W can be smoothly raised or lowered. Furthermore, the rapid elevation or fall of the piston P and the workpiece W can be prevented.

According to the second embodiment, by exerting an external force on the rod 3 via the grip 5 in the same manner as the first embodiment, the workpiece W can be raised or lowered with a slight external force. By providing a two-way valve in the middle of the oil path 131 and closing the two-way valve in a balanced condition, the workpiece W can be raised or lowered by exerting an external force directly on the workpiece as the same in the first embodiment.

Furthermore, since the pressure regulating circuit 102 is provided with the pressure reducing valve 105 and the relief valve 107, the difference of the primary pressure and the secondary pressure in the control valve 109 is kept constant regardless of the supply pressure of the air supply R or the weight of the workpiece. Accordingly, the difference between the pressure at the upperstream side and the downstream side of the needle valve 129 is also kept constant. Therefore, in a balanced condition, by exerting an external force on the piston P, the piston P and the workpiece W can be smoothly raised or lowered, and the rapid elevation or fall of the piston P and the workpiece W can be prevented.

When the pressure in the pressure sensitive oil chamber 19 is lower than the pressure in the working chamber 4 because, for example, the pressure sensitive area X of pressure sensitive piston 13 is larger than the pressure receiving area Y of the piston P or for other reasons, by increasing the urging force of the corrective spring 45a with the control piston rod 41a of the pressure sensitive valve 103, the pressure regulating circuit 102 can be activated as aforementioned. Specifically, the control piston rod 41a and the corrective spring 45a correspond to the additive correction means of the invention.

When the pressure in the pressure sensitive oil chamber 19 is higher than the pressure in the working chamber 4 because, for example, the pressure sensitive area X of pressure sensitive piston 13 is smaller than the pressure receiving area Y of piston P or for other reasons, by increasing the open of the needle valve 127 to raise the air discharging speed therefrom, the pressure regulating circuit 102 can be activated as aforementioned.

As obvious from the above explanations, since the pressure in the piston pressure chamber 24 is made correspondent with the pressure in the pressure sensitive oil chamber 19 by the pressure sensitive valve 103 via the control valve 109, the piston P attains a balanced condition. The pressure reducing valve 105, which is regulated by the secondary pressure in the pressure sensitive valve 103, keeps constant the difference between the primary pressure and the secondary pressure in the control valve 109. The relief valve 107 keeps constant the difference between the pressure at the upperstream side and the downstream side of the needle valve 129. Thus, the pressure sensitive valve 103 surrounded by the control valve 109, the pressure reducing valve 105, the needle valve 129 and the relief valve 107 constitutes the pressure retention means.

Embodiment 3

The third embodiment has the structure identical with the second embodiment except for a control valve provided on the exhaustion side of the piston pressure chamber 24. The structural features and the performance of the third embodiment identical with that of the second embodiment is not explained hereinafter.

Figure 4:
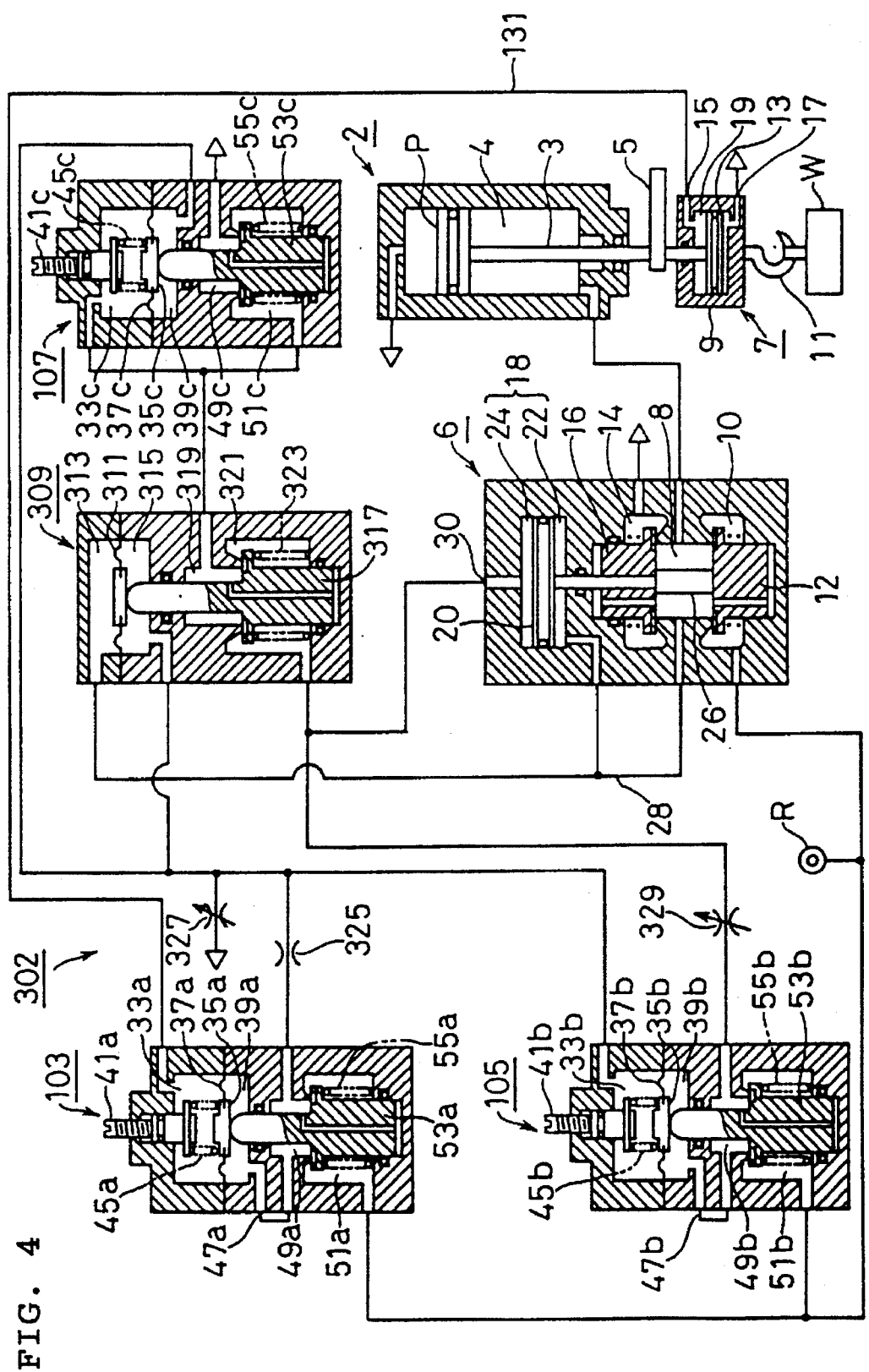
FIG. 4 is a diagrammatic representation of a pressure regulating circuit of the third embodiment of the invention.

As shown in FIG. 4, further to the pressure sensitive valve 103, the pressure reducing valve 105 and the relief valve 107 identical with those of the second embodiment, the pressure regulating circuit 302 is provided with a control valve 309 comprising a diaphragm chamber 313, an auxiliary control chamber 315, an auxiliary exhaust chamber 319 and an auxiliary pressure chamber 321. A diaphragm 311 is provided between the diaphragm chamber 313 and the auxiliary control chamber 315. The auxiliary exhaust chamber 319 and the auxiliary pressure chamber 321 are connected and disconnected by a valve member 317, which is urged upwardly to close by a spring 323. The urging force of the spring 323 is adjusted so that it slightly surpasses the load of the valve member 317. Therefore, when the pressure in the diaphragm chamber 313 surpasses the pressure in the auxiliary control chamber 315, the valve member 317 is moved downwardly to close, thereby interconnecting the auxiliary exhaust chamber 319 and the auxiliary pressure chamber 321.

The diaphragm chamber 313 of the control valve 309 is connected to the control chamber 22 and the pressure chamber 8 of the main valve 6. The auxiliary control chamber 315 communicates with the outside air via a needle valve 327 and is connected to the air ventilation chamber 49a of the pressure sensitive chamber 103 via an orifice 325 and is further connected to the diaphragm chamber 33b of the pressure reducing chamber 105. It is also connected to the pressure sensitive chamber 39c of the relief valve 107.

The auxiliary pressure chamber 321 of the control valve 309 is connected to the piston pressure chamber 24 of the main valve 6 and is further connected to the air ventilation chamber 49b of the pressure reducing valve 105 via a needle valve 329.

The auxiliary exhaust chamber 319 of the control valve 309 is connected to the diaphragm chamber 33c and to the air introduction chamber 51c of the relief valve 107.

The oil pressure chamber 33a of the pressure sensitive valve 103 is connected to the pressure sensitive oil chamber 19 of the pressure sensitive cylinder 9 via an oil path 131. The air introduction chamber 51a of the pressure sensitive valve 103 and the air introduction chamber 51b of the pressure reducing valve 105 are respectively connected to the air supply R.

In the operation of the pressure regulating circuit 302 of the third embodiment, an oil pressure is produced in the pressure sensitive oil chamber 19 by the load of the workpiece W in the same manner as the first and second embodiments. The oil pressure is introduced to the oil pressure chamber 33a of the pressure sensitive valve 103 via the oil path 131, thereby raising the pressure in the oil pressure chamber 33a to the same pressure in the pressure sensitive oil chamber 19. Accordingly, the valve member 53a is lowered so that the pressurized air flows from the air introduction chamber 51a to the air ventilation chamber 49a. The pressurized air in the air ventilation chamber 49a further flows into the diaphragm chamber 33b of the pressure reducing valve 105, the auxiliary control chamber 315 of the control valve 309 and the pressure sensitive chamber 39c of the relief valve 107.

When the pressure in the air ventilation chamber 49a, which pushes up the diaphragm 37a, surpasses the amount of the pressure in the oil pressure chamber 33a and the urging force of the corrective spring 45a, which in combination pushes down the diaphragm 37a, the valve member 53a is moved to the closed position, thereby stopping the pressurized air flowing into the air introduction chamber 51a and the air ventilation chamber 49a.

However, since the pressurized air in the circuit communicating with the air ventilation chamber 49a is gradually released from the needle valve 327, the pressure in the air ventilation chamber 49a is gradually reduced. When, by the gradual reduction of the pressure in the air ventilation chamber 49a, the force to push up the diaphragm 37a becomes lower than the amount of the pressure in the oil pressure chamber 33a and the urging force of the corrective spring 45a which in combination push down the diaphragm 37a, the valve member 53a is again moved to the opened position. As a result, the pressurized air is flowed into the air ventilation chamber 49a as aforementioned, thereby increasing the pressure in the air ventilation chamber 49a.

By supplying the pressurized air to or discharging it from the air ventilation chamber 49a, the pressure in the air ventilation chamber 49a is kept approximately equal to the pressure in the oil pressure chamber 33a.

In the pressure reducing valve 105, when the pressurized air supplied from the pressure sensitive valve 103 increases the pressure in the diaphragm chamber 33b, the valve member 53b is lowered, thereby interconnecting the air introduction chamber 51b and the air ventilation chamber 49b. Accordingly, the pressurized air flows from the air supply R via the pressure reducing valve 105 into the needle valve 329. The airflow is disturbed by the needle valve 329. As a result, the pressure at the upperstream side of the needle valve is increased, thereby increasing the pressure in the pressure sensitive chamber 39b. When the pressure in the pressure sensitive chamber 39b surpasses the amount of the pressure in the diaphragm chamber 33b and the urging force of the corrective spring 45b, the plate 35b is brought into a neutral position, thereby closing the valve. If the pressure in the pressure sensitive chamber 39b is lower than the amount of the pressure in the diaphragm chamber 33b and the urging force of the corrective spring 45b, the pressure reducing valve 105 is opened.

As mentioned in the second embodiment, the secondary pressure of the pressure reducing valve 105 is higher than the secondary pressure in the pressure sensitive valve 103 introduced into the diaphragm chamber 33b and the difference equals the urging force of the corrective spring 45b. Therefore, the pressure at the upperstream side of the needle valve 329 is also higher than the pressure in the pressure sensitive valve 103 and the difference equals the urging force of the corrective spring 45b.

The air passed through the needle valve 329 flows into the auxiliary pressure chamber 321 of the control valve 309 and the piston pressure chamber 24 of the main valve 6, thereby increasing the pressure in these chambers.

When the pressure in the piston pressure chamber 24 is increased to surpass the pressure in the control chamber 22 by the pressurized air supplied from the pressure reducing valve 105, the pressure control piston 20 is pushed down. Accordingly, the air supply valve member 12 is lowered, thereby introducing the pressurized air to the pressure chamber 8, the working chamber 4 and the control chamber 22. The pressure in the working chamber 4 elevates the piston P.

On the other hand, by the pressure increase in the pressure chamber 8 and the control chamber 22, the pressure in the diaphragm chamber 313 of the control valve 309, which is connected to the pressure chamber 8 and to the control chamber 22, is also increased. When the pressure in the diaphragm chamber 313 surpasses the pressure in the auxiliary control chamber 315, the valve member 317 is lowered to open the control valve 309.

By the air exhaustion from the auxiliary pressure chamber 321 of the control valve 309, the pressure in the piston pressure chamber 24 is reduced, thereby driving the pressure control piston 20 upwardly. As a result, the exhaustion valve member 16 is moved to the opened position to reduce the pressure in the working chamber 4, the pressure chamber 8 and the control chamber 22. Accordingly, the pressure in the diaphragm chamber 313 of the control valve 309 is also reduced, thereby closing the control valve 309 and stopping the airflow from the auxiliary pressure chamber 321.

Thus, when the pressure in the control chamber 22 becomes lower than the pressure in the piston pressure chamber 24, the pressurized air is supplied to the control chamber 22. When the pressure in the control chamber 22 surpasses the pressure in the piston pressure chamber 24, the pressurized air is exhausted from the control chamber 22 so that the pressure in the control chamber 22 and the pressure in the piston pressure chamber 24 reach equilibrium.

The pressure in the auxiliary pressure chamber 315 is the secondary pressure of the pressure sensitive valve 103. Therefore, when the pressure in the diaphragm chamber 313 surpasses the secondary pressure of the pressure sensitive valve 103, the control valve 309 opens. On the contrary, when the pressure in the diaphragm chamber 313 becomes lower than the secondary pressure of the pressure sensitive valve 103, the control valve 309 closes. The pressure in the diaphragm chamber 313 is equal to the pressure in the control chamber 22. Accordingly, when the pressure in the control chamber 22 is equal to the pressure in the piston pressure chamber 24, the pressure in the control chamber 22 is the secondary pressure of the pressure sensitive valve 103.

Since the pressure receiving area of both sides of the pressure control piston 20 respectively facing the piston pressure chamber 24 and the control chamber 22 are equal to each other, when the pressure in the control chamber 22 equals the pressure in the piston pressure chamber 24, the pressure in the piston pressure chamber 24 equals the pressure in the control chamber 22. Therefore, the pressure in the piston pressure chamber 24 equals the secondary pressure of the pressure sensitive valve 103.

When the pressure in the control chamber 22 and the pressure in the piston pressure chamber 24 equal each other as aforementioned, no pressurized air is supplied to or discharged from the working chamber 4. Therefore, the piston P attains a balanced condition without being raised or lowered.

Since the pressure receiving area of both sides of the pressure control piston 20 respectively facing the piston pressure chamber 24 and the control chamber 22 are equal to each other, the pressure in the piston pressure chamber 24 equals the pressure in the control chamber 22, which is equal to the secondary pressure in the pressure sensitive valve 103. Since the secondary pressure in the pressure sensitive valve 103 corresponds to the pressure in the pressure sensitive oil chamber 19, the pressure in the piston pressure chamber 24 corresponds to the pressure in the pressure sensitive oil chamber which is produced by the load of the workpiece W. Therefore, the piston P of the pneumatic cylinder 2 attains a balanced condition without any adjustment according to the workpiece W.

On the other hand, in the relief valve 107, the diaphragm chamber 33c communicates with the auxiliary exhaustion chamber 319 of the control valve 309. Therefore, when the control valve 309 opens, the piston pressure chamber 24 is interconnected with the auxiliary exhaustion chamber 319. As a result, the pressure in the auxiliary exhaustion chamber 319 is increased, thereby increasing the pressure in diaphragm chamber 33c.

If the amount of the pressure in the diaphragm chamber 33c and the urging force of the corrective spring 45c to push down the diaphragm 37c is larger than the pressure in the pressure sensitive chamber 39c to push down the diaphragm 37c, the valve member 53c is moved to the opened position, thereby discharging the secondary pressurized air of the control valve 309 to the outside air. On the contrary, if the amount of the pressure in the diaphragm chamber 33c and the urging force of the corrective spring 45c to push down the diaphragm 37c is smaller than the pressure in the pressure sensitive chamber 39c to push down the diaphragm 37c, the valve member 53c is moved to the closed position. Concisely, if the pressure in the diaphragm 33c is higher than the difference between the pressure in the pressure sensitive chamber 39c and the urging force of the corrective spring 45c, the valve member 53c is moved to the opened position. In contrast, if the pressure in the diaphragm 33 is lower than the aforementioned difference, the valve member 53c is moved to the closed position.

Therefore, the secondary pressure in the control valve 309 is lower than the pressure in the pressure sensitive chamber 39c, which is equal to the secondary pressure of the pressure sensitive valve 103, and the difference equals the urging force of the spring 45c.

When the control valve 309 is opened to interconnect the piston pressure chamber 24 and the auxiliary exhaustion chamber 319, the air in the piston pressure chamber 24, which approximately equals the secondary pressure of the control valve 309, is exhausted towards the relief valve 107.

When the piston P is in a balanced condition as aforementioned, by exerting an external force via the grip 5 on the piston P and the workpiece W to raise them, the pressure in the working chamber 4 is decreased, thereby reducing the pressure in the diaphragm chamber 313 and the control chamber 22. The control valve 309 is not opened by the pressure reduction in the diaphragm chamber 313. When the pressure in the control chamber 22 is reduced, the pressure control piston 20 is pushed down, thereby lowering the piston rod 26. As a result, the highly pressurized air flows from the air supply R into the working chamber 4.

When the pressure in the piston pressure chamber 24 is reduced by lowering the pressure control piston 20, the pressurized air flows through the needle valve 329.

Since the pressure of the pressurized air is adjusted by the pressure reducing valve 105 so that it surpasses the secondary pressure of the pressure sensitive valve 103 and that the difference equals and never surpasses the urging force of the corrective spring 45b, the pressurized air does not rapidly flow via the needle valve 329 to the piston pressure chamber 24. Therefore, no excessive air is supplied to the piston pressure chamber 24 which may cause the rapid increase of the pressure in the piston pressure chamber 24. Accordingly, the rapid lowering of the piston rod 26 caused by rapidly pushing down the pressure control piston 20 is prevented, thereby preventing the rapid flowing of the pressurized air from the air supply R into the working chamber 4. Thus, the rapid elevation of the piston P and the workpiece W caused by rapid flowing of the pressurized air into the working chamber 4 can be prevented.

However, since the airflow into the piston pressure chamber 24 is not prevented, the piston P and the workpiece W can be smoothly elevated.

In such a balanced condition, by exerting an external force on the piston P and the workpiece W to lower them, the pressure in the working chamber 4 is increased, thereby increasing the pressure in the diaphragm chamber 313 and the control chamber 22. The control valve 309 is opened by the pressure increase in the diaphragm chamber 313.

When the control valve 309 opens, the air is exhausted from the piston pressure chamber 24 to the relief valve 107. Since the secondary pressure of the control valve 309 is lower than the secondary pressure of the pressure sensitive valve 103 and the difference equals and never surpasses the urging force of the corrective spring 45c, the air in the piston pressure chamber 24 is not rapidly exhausted to the relief valve 107.

Accordingly, the pressure in the piston pressure chamber 24 is not rapidly reduced, thereby preventing the rapid elevation of the pressure control piston 20 or the piston rod 26 which may cause the rapid elevation of the exhaustion valve member 16. Therefore, the air in the pressure chamber 8 is not rapidly exhausted, thereby preventing rapid reduction of the pressure in the working chamber 4 which may cause rapid lowering of the piston P and the workpiece W.

However, since the exhaustion from the piston pressure chamber 24 is not prevented, the piston P and the workpiece W can be smoothly lowered.

As aforementioned, according to the pressure regulating circuit 302 of this embodiment, by exerting an external force on the piston P in a balanced condition, the piston P and the workpiece W can be smoothly raised or lowered. Furthermore, the rapid elevation or lowering of the piston P and the workpiece W can be prevented.

When the pressure in the pressure sensitive oil chamber 19 is lower than the pressure in the working chamber 4 because, for example, the pressure sensitive area X of the pressure sensitive piston 13 is larger than the pressure receiving area Y of the piston P or for other reasons, by increasing the urging force of the corrective spring 45a with the control piston rod 41a of the pressure sensitive valve 103, the pressure regulating circuit 302 can be activated as aforementioned. Specifically, the control piston rod 41a and the corrective spring 45a correspond to the additive correction means of the invention.

When the pressure in the pressure sensitive oil chamber 19 is higher than the pressure in the working chamber 4 because, for example, the pressure sensitive area X of pressure sensitive piston 13 is smaller than the pressure receiving area Y of piston P or for other reasons, by increasing the open of the needle valve 327 to raise the air discharging speed therefrom, the pressure regulating circuit 302 can be activated as aforementioned. Specifically, the needle valve 327 corresponds to the subtractive correction means of the invention.

In the pressure regulating circuit 302 of this embodiment, by exerting an external force on the rod 3 via the grip 5 in the same manner as in the first and second embodiments, the workpiece W can be raised or lowered with a slight external force. Additionally, as the same in the first embodiment, by providing a two-way valve in the middle of the oil path 131 and closing the two-way valve in a balanced condition, the workpiece W can be raised or lowered by applying an external force directly to the workpiece W.

Furthermore, since the pressure regulating circuit 302 is provided with the pressure reducing valve 105 and the relief valve 107, the difference of the pressure between the upperstream side and the downstream side of the needle valve 329 and the difference between the primary pressure and the secondary pressure in the control valve 309 are respectively kept constant regardless of the supply pressure of the air supply R or the load of the workpiece W. Accordingly, the piston P and the workpiece W can be smoothly raised or lowered, and the rapid elevation or fall of the piston P and the workpiece W can be prevented.

As obvious from the above explanations, since the pressure in the piston pressure chamber 24 is made correspondent with the pressure in the pressure sensitive oil chamber 19 by the pressure sensitive valve 103 via the control valve 309, the piston P attains a balanced condition. The difference between the pressure at the upperstream side and at the downstream side of the needle valve 329 is kept constant by the pressure reducing valve 105, which is regulated by the secondary pressure of the pressure sensitive valve 103. The difference between the primary pressure and the secondary pressure in the control valve 109 is kept constant by the relief valve 107. Thus, the pressure sensitive valve 103 surrounded by the control valve 309, the pressure reducing valve 105, the needle valve 329 and the relief valve 107 constitutes the pressure retention means.

Embodiment 4

The structural features and the performance of the fourth embodiment identical with that of first to third embodiments and modification 1 is not explained hereinafter.

Figure 5:
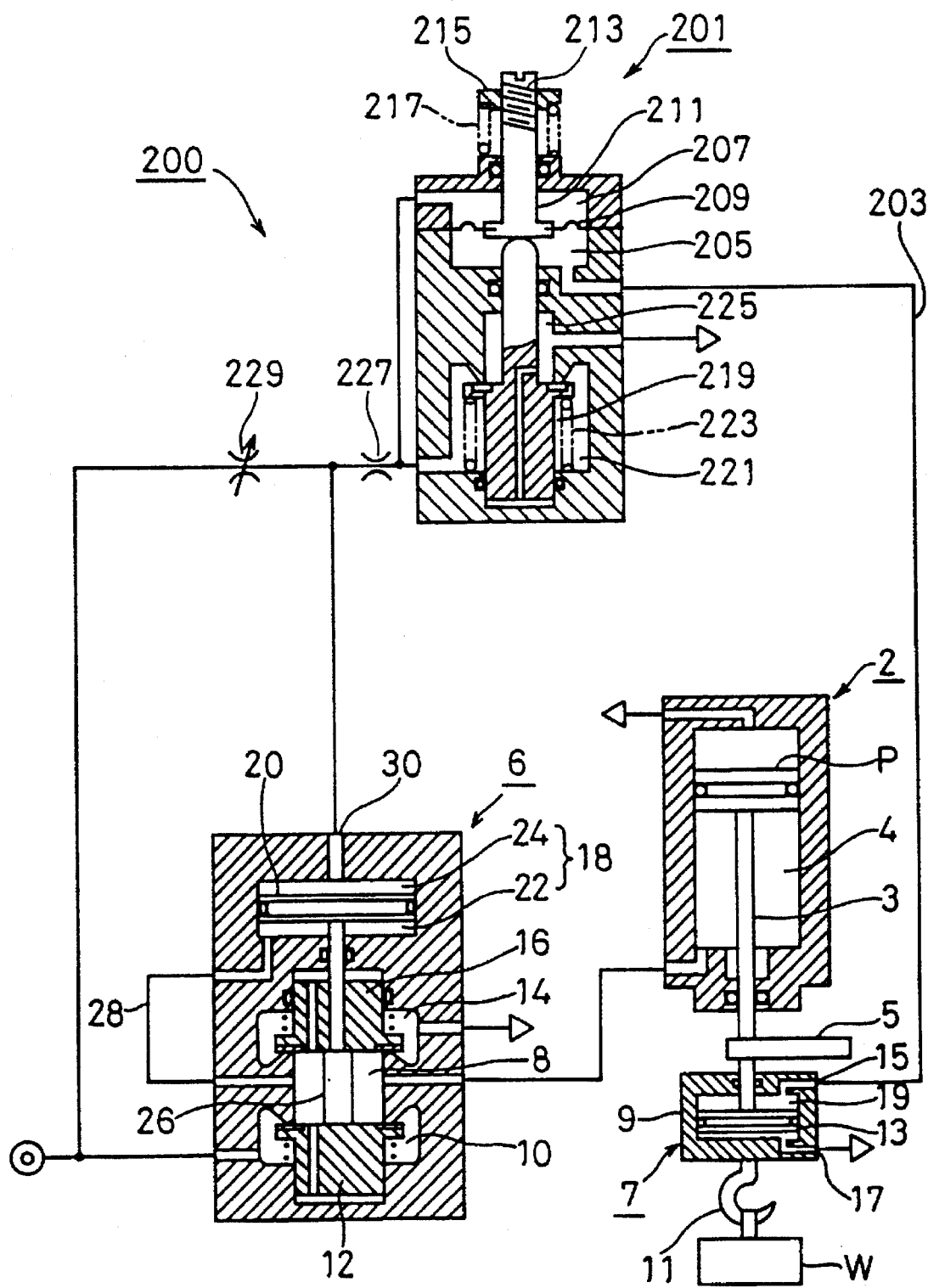
FIG. 5 is a diagrammatic representation of a pressure regulating circuit of the fourth embodiment of the invention.

As shown in FIG. 5, the pressure sensitive valve 201 of the fourth embodiment is provided as a relief valve of piston pressure chamber 24.

The pressure sensitive valve 201 comprises an oil pressure chamber 205 connected to an oil path 203 and a pressure sensitive chamber 207 opposed to the oil pressure chamber 205. A diaphragm 209 is provided between the oil pressure chamber 205 and the pressure sensitive chamber 207. A control rod 211 projecting from the head portion of the pressure sensitive valve 201 is attached to the diaphragm 209. The control rod 211 is screwed at the end thereof with a control nut 215 at a screw part 213. A control spring 217 is retained between the control nut 215 and the head portion of the pressure sensitive valve 201. The control rod 211 is urged upwardly by the control spring 217. The strength of the urging force is controlled by pivoting the control nut 215.

The valve member 219 abutted on the lower end of the control rod 211 is urged toward the control rod 211 by a spring 223 provided inside an air introduction chamber 221. The urging force is adjusted so that it slightly surpasses the load of the valve member 219. When the pressure in the pressure sensitive chamber 207 surpasses the pressure in the oil pressure chamber 205, the valve member 219 is pushed down by the control rod 211 which moves downwardly along with the diaphragm 209, thereby interconnecting the air introduction chamber 221 and an exhaust chamber 225. The valve member 219 can be lowered by reducing the urging force of the spring 217 by the control nut 215 even if the pressure in the pressure sensitive chamber 207 does not surpass the pressure in the oil pressure chamber 205.

In the pressure sensitive chamber 201, the pressure sensitive chamber 207 is interconnected with the air introduction chamber 221, which is further connected to the piston pressure chamber 24 of the main valve 6 via the orifice 227.

The piston pressure chamber 24 is connected to the air supply R via a needle valve 229.

In operation of the pressure regulating circuit 200 of the fourth embodiment, when the needle valve 229 of the pressure regulating circuit 200 opens, the pressurized air flows into the piston pressure chamber 24 pushing the pressure control piston 20, thereby lowering the air supply valve member 12, so that the pressurized air flows into the working chamber 4. The pressurized air also flows into the pressure sensitive chamber 207 of the pressure sensitive valve 201 to increase the pressure in the pressure sensitive chamber 207.

On the other hand, the pressure according to the load of the workpiece W is produced in the pressure sensitive chamber 19 and is transferred via the oil path 203 to the oil pressure chamber 205 of the pressure sensitive valve 201.

When the pressure in the pressure sensitive chamber 207 surpasses the pressure in the oil pressure chamber 205, the valve member 219 is lowers, thereby interconnecting the air introduction chamber 221 and the exhaustion chamber 225. Accordingly, the pressurized air is discharged from the piston pressure chamber 24 to reduce the pressure in the piston pressure chamber 24.

Therefore, when the pressure in the piston pressure chamber 24 and the pressure sensitive chamber 207 increases to surpass the pressure in the oil pressure chamber 205 by the pressurized air which flows through the needle valve 229, the pressure sensitive valve 201 opens to exhaust the air from the piston pressure chamber 24, thereby keeping the pressure in the piston pressure chamber 24 approximately constant. The pressure in the piston pressure chamber 24 approximately equals the pressure in the oil pressure chamber 205 or in the pressure sensitive oil chamber 19.

When the pressurized air flows into the working chamber 4 as aforementioned, the pressure in the working chamber 4, the pressure chamber 8 and the control chamber 22 increases. When the pressure in the control chamber 22, which equals the pressure in the working chamber 4, surpasses the pressure in the piston pressure chamber 24, the valve member 16 is elevated, thereby discharging the air from the working chamber 4 to decrease the pressure in the working chamber 4, the pressure chamber 8 and the control chamber 22. When the pressure in the control chamber 22, which equals the pressure in the working chamber 4, becomes equal to the pressure in the piston pressure chamber 24, no pressurized air is supplied to or discharged from the working chamber 4. Therefore, the piston P attains a balanced condition without being raised or lowered.

In such a balanced condition, the pressure in the pressure sensitive oil chamber 19, the oil pressure chamber 205, the pressure sensitive chamber 207 and the piston pressure chamber 24 are equal to each other. Therefore, the piston P of the pneumatic cylinder 2 attains a balanced condition without any adjustment according to the workpiece W.

When the pressure in the pressure sensitive oil chamber 19 is lower than the pressure in the working chamber 4 because, for example, the pressure sensitive area X of pressure sensitive piston 13 is larger than the pressure receiving area Y of the piston P or for other reasons, by increasing the opening of the needle valve 229 to raise the air supply speed to the piston pressure chamber 24, the pressure regulating circuit 200 can be activated as aforementioned.

In the structure of the fourth embodiment, as the same as in the first embodiment, by providing a two-way valve in the middle of the oil path 203 and closing the two-way valve in a balanced condition, the workpiece W can be raised or lowered by exerting an external force directly on the workpiece W.

When the pressure in the pressure sensitive oil chamber 19 is higher than the pressure in the working chamber 4 because, for example, the pressure sensitive area X of pressure sensitive piston 13 is smaller than the pressure receiving area Y of piston P or for other reasons, by reducing the urging force of the control spring 217 with the control nut 215 of the pressure sensitive valve 201, the pressure regulating circuit 200 can be activated as aforementioned. Specifically, the control nut 215 and the control spring 217 correspond to the subtractive correction means of the invention.

Furthermore, as obvious from the above examinations, the needle valve 229 and the pressure sensitive valve 201 respectively correspond to the limiting means and the exhaustion control means of the invention, and in combination constitute the pressure retention means.

Modification 2

The responsibility of the pressure regulating circuit 200 of the fourth embodiment is improved. The pneumatic cylinder, the main valve and the pressure sensitive valve identical with those of the third embodiment are provided.

Figure 6:
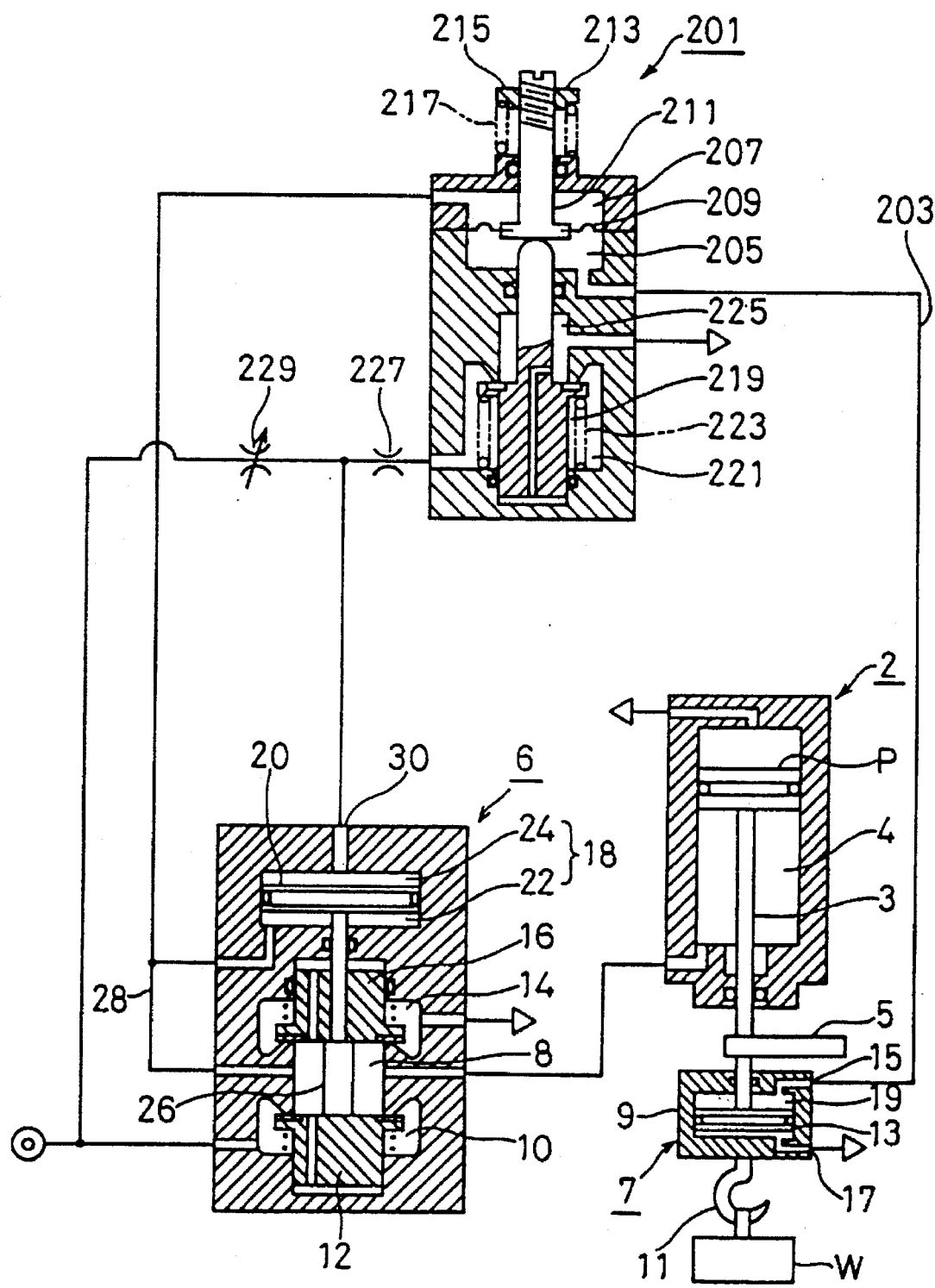
FIG. 6 is a diagrammatic representation of a pressure regulating circuit of the second modification.

As shown in FIG. 6, different from the fourth embodiment, the pressure sensitive chamber 207 of the pressure sensitive valve 201 is not connected to the air introduction chamber 221 and is connected to the pressure chamber 8 of the main valve 6.

As obvious from the structure shown in the figure, the pressure in the working chamber 4 is introduced into the pressure sensitive chamber 207 as a feedback pressure. Therefore, the responsibility is higher than that of the fourth embodiment, in which the pressure in the working chamber 4 is indirectly introduced into the pressure sensitive chamber 207 via the pressure in the piston pressure chamber 24 as a feedback pressure.

By providing a two-way valve in the middle of the oil path 203 and closing the two-way valve in a balanced condition as the same manner with the fourth embodiment, the workpiece W can be raised or lowered by exerting an external force directly on the workpiece W.

In the aforementioned embodiments, a workpiece retention member having a pressure sensitive piston is used. However, a workpiece retention member of bellows-type may be provided instead.

Figure 7:
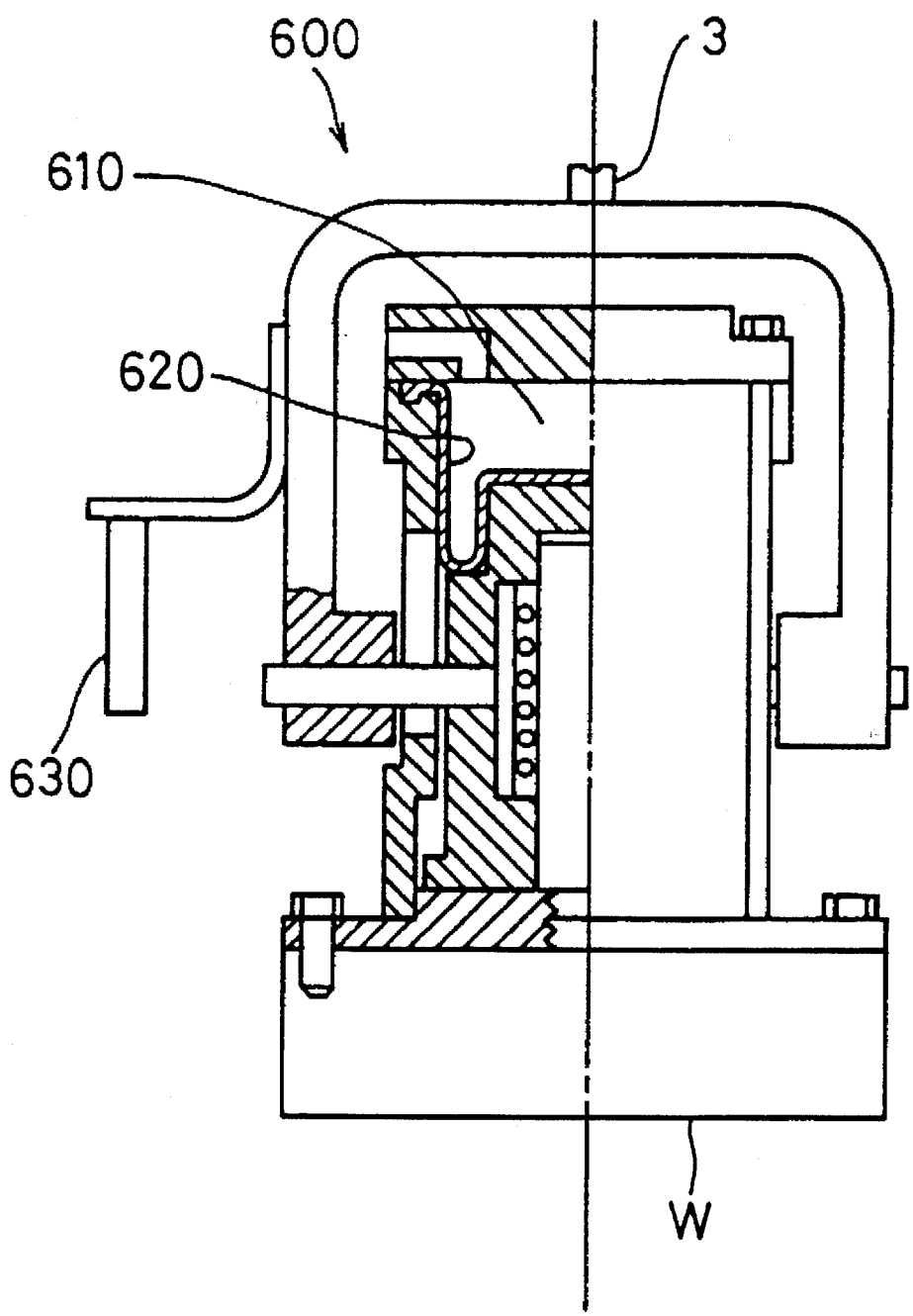
FIG. 7 is a diagrammatic representation of the workpiece retention member provided with a bellowsphragm.

For example, as shown in FIG. 7, a workpiece retention member 600 has a structure in which a pressure sensitive oil chamber 610 is formed with a bellowsphragm 620. The pressure sensitive oil chamber 610 is connected to the oil pressure chamber of the pressure sensitive valve. The workpiece retention member 600 is connected to a rod 3, to the side of which a grip 630 is attached. In such a structure, no oil leak can be caused, and more sensitive activation can be achieved.

Modification 3

In the aforementioned embodiments and modifications, the workpiece retention member is constituted by a pressure sensitive cylinder. The oil pressure in the pressure sensitive oil chamber of the pressure sensitive cylinder is introduced to the pressure sensitive valve via the oil path. However, it is possible to omit the pressure introduction via the oil path by incorporating the pressure sensitive valve in the workpiece retention member.

Figure 8:
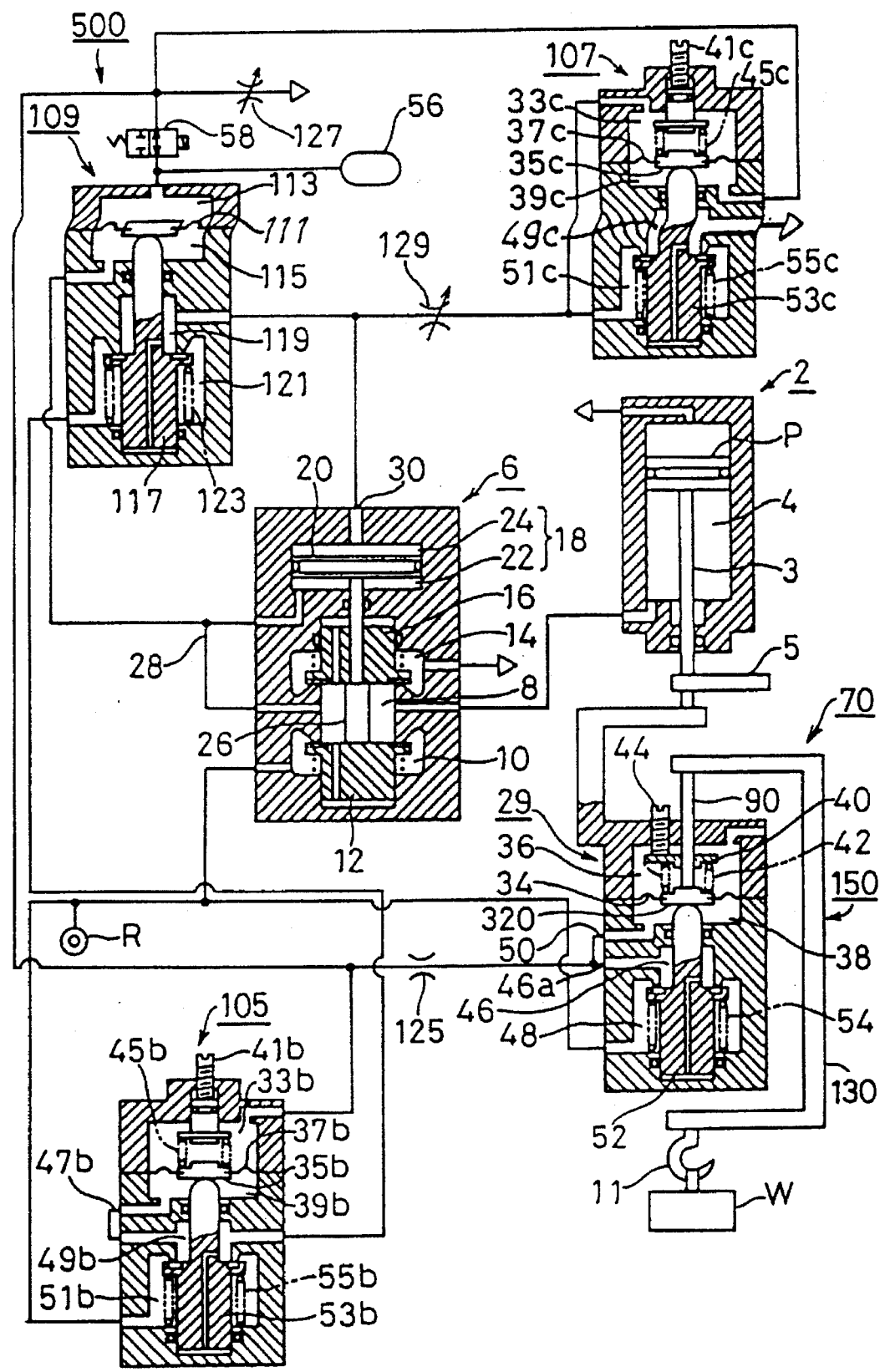
FIG. 8 is a diagrammatic representation of a pressure regulating circuit of the third modification.
Figure 9:
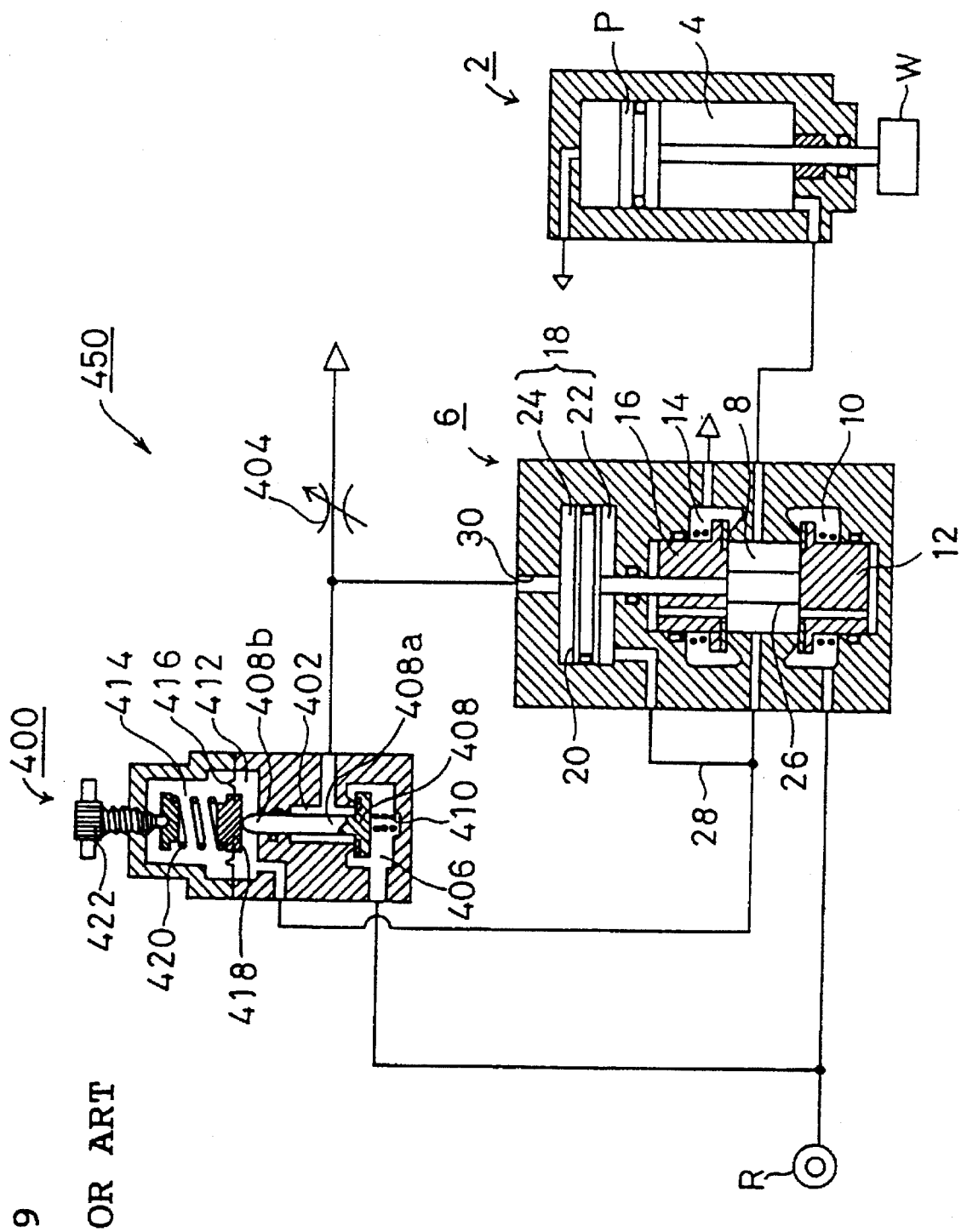
FIG. 9 is a diagrammatic representation of the conventional pressure regulating circuit.

As shown in FIG. 8, in the pressure regulating circuit 500 of the third modification, the grip 5 as a piston driving means is attached to the rod 3 of the pneumatic cylinder 2. A workpiece retention member 70 is connected to the tip of the rod 3.

The workpiece retention member 70 includes a pressure reducing valve 29 connected to the rod 3 and a linking part 150.

The linking part 150 comprises a sliding shaft 90 secured to the upper side of a U-shaped link member 130. To the lower side of the U-shaped link member 130 the hook 11 is attached.

The upper inside of the pressure reducing valve 29 is divided horizontally into two portions by a diaphragm 34 having a plate 320 in the middle thereof. The upper portion is a spring chamber 36, and the lower portion is a counterforce chamber 38. The spring chamber 36 is opened to the outside air. The pressure receiving area of the diaphragm 34 including the plate 320 at the side of the counterforce chamber 38 approximately equals the pressure receiving area of the piston P at the side of the rod 3.

The tip of the sliding shaft 90 of the linking part 150 abuts the plate 320 of the diaphragm 34. Between a spring receiving plate 40 penetrated by the sliding shaft 90 and the plate 320, a corrective spring 42 is held in a compressed state. The sliding shaft 90 can be axially slid. A control piston rod 44 which is screwed at the head of the pressure reducing valve 29 abuts the upper surface of the spring receiving plate 40. By rotating the control piston rod 44 to be elevated or lowered, the urging force of the corrective spring 42 can be controlled.

At the lower portion of the pressure reducing valve 29 an air ventilation chamber 46 and an air introduction chamber 48 are provided. An introduction valve member 52 having a shaft extending from the air introduction chamber 48 to the counterforce chamber 38 is housed in the pressure reducing valve 29. At the lower portion of the introduction valve member 52 a spring 54 is provided for urging the introduction valve member 52 to the closed position. The upper end of the introduction valve member 52 projects inside the counterforce chamber 38 to abut the plate 320 of the diaphragm 34. The weight of the introduction valve member 52 and the upward force of the spring 54 is approximately balanced so that the introduction valve member 52 is opened or closed due to the elevation or lowering of the plate 320 of the diaphragm 34.

The air ventilation chamber 46 is connected to the counterforce chamber 38 via a shortcut 50. The air introduction chamber 48 is connected to the air supply R. A control port 46a of the air ventilation chamber 46 is connected to a diaphragm chamber 33b of the pressure reducing valve 105 via the orifice 125. The control port 46a is further connected to the diaphragm chamber 113 of the control valve 109 via a two-way valve 58. The diaphragm chamber 113 of the control valve 109 is connected to the outside air via the needle valve 127, and to the pressure sensitive chamber 39c of the relief valve 107.

An air-tank 56 is provided between the two-way valve 58 and the control valve 109.

As obvious from the above explanations, the workpiece retention member 70 of this modification is composed of the workpiece retention member 7 in combination with the pressure sensitive valve 103, both are of the second embodiment. Therefore, the structural features and the performance of the third modification identical with that of the second embodiment is not explained hereinafter.

The primary adjustment before installing the workpiece is now explained.

In the primary state in which the pressure air is not supplied from the air supply R, there is no gauge pressure in the counterforce chamber 38. Therefore, the plate 320 is moved downwardly by the urging force of the corrective spring 42 and by the load of the linking part 150, thereby moving the introduction valve member 52 to the opened position. When the pressurized air is suppled from the air supply R under such condition, since the introduction valve member 52 is placed at the opened position, the pressurized air flows from the control port 46a to the diaphragm chamber 33b of the pressure reducing valve 105, to the diaphragm chamber 113 of the control valve 109, to the pressure sensitive chamber 39c of the relief valve 107 and the counterforce chamber 38. The activation continues as the same with that of the second embodiment when the workpiece W is attached to the hook 11. There is no pressurized air supply to or from the working chamber 4.

When there is no pressure air supply to or from the working chamber 4, the piston P cannot be elevated because the load of the workpiece retention member 70 is too large, or is placed at the elevating end against the workpiece retention member 70, or is in a balanced condition without being raised or lowered. Under such a state, since the pressure in the counterforce chamber 38 or the pressure in the piston pressure chamber 24 can be controlled by rotating the control piston rod 44 for controlling the urging force of the corrective spring 42, the position of the control piston rod 44 or the urging force of the corrective spring 42 can be controlled so that the piston P attains a balanced condition without raised or lowered from the position elevated along with the workpiece retention member 70.

In the pressure regulating circuit 500, when the piston P is balanced by controlling the corrective spring 42, the pressure in the pressure chamber 8, the control chamber 22 and the auxiliary control chamber 115 respectively connected to the working chamber 4 equal to each other. The pressure in the counterforce chamber 38 equals the pressure in the diaphragm chamber 113. Since the pressure in the auxiliary control chamber 115 is balanced with the pressure in the diaphragm chamber 113, the pressure in the working chamber 4 equals the pressure in the counterforce chamber 38.

After finishing the primary adjustment, by attaching the workpiece W to the hook 11, the introduction valve member 52 is moved to the opened position, thereby introducing the pressurized air from the air supply R to the control port 46a. The pressurized air from the control port 46a further flows to the counterforce chamber 38, to the diaphragm chamber 33b of the pressure reducing valve 105, to the diaphragm chamber 113 of the control valve 109 and to the pressure sensitive chamber 39c of the relief valve 107.

Therefore, similarly with the second embodiment, according to the pressure regulating circuit 500 of this modification, when an external force is applied to the piston P in a balanced condition, the piston P and the workpiece W can be smoothly raised or lowered. Furthermore, the rapid elevation or fall of the piston P and the workpiece W can be prevented.

In the pressure regulating circuit 500 of this modification, by exerting a slight external force to the rod 3 via the grip 5, the workpiece W can be elevated or lowered. By closing the two-way valve 58 in a balanced condition, the workpiece W can be raised or lowered by exerting an external force directly on the workpiece W.

Furthermore, since the pressure regulating circuit 500 is provided with the pressure reducing valve 105 and the relief valve 107, the difference of the primary pressure and the secondary pressure in the control valve 109 is kept constant regardless of the supply pressure of the air supply R or the weight of the workpiece W. Accordingly, the difference between the pressure at the upperstream side and at the downstream side of the needle valve 129 is also kept constant. Therefore, in a balanced condition, by exerting an external force on the piston P, the piston P and the workpiece W can be smoothly raised or lowered, and the rapid elevation or fall of the piston P and the workpiece W can be prevented.

Since the pressure in the piston pressure chamber 24 is maintained with the exhaust and supply of the pressurized air continuing, no hysteresis is generated.

By gradual release of the pressurized air from the needle valve 127, the rapid elevation of the piston P when the workpiece W is removed is also prevented.

This invention has been described above with reference to the preferred embodiments as shown in the figures. Modifications and alterations may become apparent to one skilled in the art upon reading and understanding the specification. Despite the use of the embodiment for illustration purposes, the invention is intended to include all such modifications and alterations within the spirit and scope of the appended claims.

I claim:

1. A pressure regulating circuit comprising:

a main valve (6) with a pressure chamber (8), the pressure chamber (8) having an exhaust side and being connected to a pressurized air supply (R) via an air supply valve member (12), an exhaust chamber (14) connected to or disconnected from the pressure chamber (8) via an exhaust valve member (16) and connected to the outside air via an exhaust port, a piston rod (26) for positioning the air supply valve member (12) and the exhaust valve member (16) into a closed position when the piston rod (26) is in a neutral position, positioning the air supply valve member (12) into an opened position when the piston rod (26) moves down, and positioning the exhaust valve member (16) into an opened position when the piston rod (26) moves up, a control chamber (22) connected to the pressure chamber (8), a piston pressure chamber (24) opposed to the control chamber (22) and connected to the pressurized air source (R), and a pressure control piston (20) displaced according to the difference in pressure between the control chamber (22) and the piston pressure chamber (24) for raising and lowering the piston rod (26);

a pneumatic cylinder (2) with a working chamber (4) connected to the pressure chamber (8) of the main valve (6) and a piston (P) to which a load according to the weight of a workpiece is applied via a load transferring means and also an exerting force against the workload is applied by the pressurized air in the working chamber (4);

a workpiece retention member including a pressure reducing valve (29), the pressure reducing valve (29) having a counterforce chamber (38) in which a pressure approximately equal to the pressure in the working chamber (4) when the load counteracts the exerting force is produced when the load of the workpiece is exerted and including a linking member (150); and a pressure retention means.

2. The pressure regulating circuit of claim 1, wherein the pressure reducing valve (29) comprises a control piston rod (44), a spring chamber (36), a diaphragm (34), a plate (320), an air introduction chamber (48), a spring (54), an air introduction valve member (52), an air ventilation chamber (46), a corrective spring (42), a spring receiving plate (40), a control port (46a) and a shortcut (50).

3. The pressure regulating circuit of claim 1, wherein the linking member (150) comprises a sliding shaft (90), a U-shaped link member (130) and a hook (11) interconnected to exert an axial external force on the piston.

* * * * *